(12) United States Patent
Bai et al.

(10) Patent No.: US 12,317,232 B2
(45) Date of Patent: May 27, 2025

(54) RULES FOR DETERMINING AN APPLICATION TIME FOR A DOWNLINK CONTROL INFORMATION (DCI) BASED UPDATE

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 519 days.

(21) Appl. No.: 17/557,881

(22) Filed: Dec. 21, 2021

(65) Prior Publication Data

US 2022/0240223 A1 Jul. 28, 2022

Related U.S. Application Data

(60) Provisional application No. 63/140,905, filed on Jan. 24, 2021.

(51) Int. Cl.
*H04W 4/00* (2018.01)
*H04L 5/00* (2006.01)
(Continued)

(52) U.S. Cl.
CPC .......... *H04W 72/02* (2013.01); *H04L 5/0053* (2013.01); *H04L 27/26025* (2021.01);
(Continued)

(58) Field of Classification Search
CPC ................. H04L 12/413; H04L 5/0053; H04L 27/26025; H04L 5/0048; H04L 5/0078;
(Continued)

(56) References Cited

U.S. PATENT DOCUMENTS 9,674,835 B2 * 6/2017 Kim ...................... H04L 5/0042
10,631,323 B2 * 4/2020 Zeng ................. H04W 72/1273
(Continued)

FOREIGN PATENT DOCUMENTS

WO WO-2023187716 A1 * 10/2023

OTHER PUBLICATIONS

International Search Report and Written Opinion—PCT/US2021/064929—ISA/EPO—Mar. 29, 2022.
(Continued)

*Primary Examiner* — Phuongchau Ba Nguyen
(74) *Attorney, Agent, or Firm* — Patterson + Sheridan, L.L.P.

(57) ABSTRACT

Certain aspects of the present disclosure relate to wireless communications, and more particularly, to techniques for determining when to apply downlink control information (DCI)-based updates. A method that may be performed by a user equipment (UE) includes receiving a downlink control information (DCI) indicating an update to be applied to at least one of an uplink (UL) transmission or a downlink (DL) transmission, determining an application time for applying the update based, at least in part, on a slot where an acknowledgement (ACK) was transmitted, and applying the update in accordance with the determined application time.

30 Claims, 16 Drawing Sheets

(51) Int. Cl.
*H04L 27/26* (2006.01)
*H04W 52/14* (2009.01)
*H04W 52/24* (2009.01)
*H04W 72/02* (2009.01)
*H04W 72/0446* (2023.01)
*H04W 72/23* (2023.01)
*H04W 72/51* (2023.01)

(52) U.S. Cl.
CPC ....... *H04W 52/146* (2013.01); *H04W 52/242* (2013.01); *H04W 72/0446* (2013.01); *H04W 72/23* (2023.01); *H04W 72/51* (2023.01)

(58) Field of Classification Search
CPC .... H04L 5/0055; H04L 5/0007; H04W 72/02; H04W 52/146; H04W 52/242; H04W 72/0446; H04W 72/23; H04W 72/51; H04W 52/24; H04W 52/244; H04W 28/04; H04W 72/04; H04W 72/042; H04W 88/08; H04W 28/08; H04W 28/084; H04W 36/22; H04W 72/12; H04B 7/088; H04B 7/0695
See application file for complete search history.

(56) References Cited

U.S. PATENT DOCUMENTS

| | | | | |
|---|---|---|---|---|
| 10,728,913 | B2* | 7/2020 | Zhang | H04B 7/15528 |
| 11,582,781 | B2* | 2/2023 | Sun | H04W 72/1273 |
| 2020/0145167 | A1* | 5/2020 | Jung | H04L 5/0055 |
| 2020/0337072 | A1* | 10/2020 | Lunttila | H04L 5/0012 |
| 2020/0367265 | A1* | 11/2020 | Wang | H04L 5/0055 |
| 2021/0092751 | A1* | 3/2021 | Jiang | H04W 76/27 |
| 2021/0184812 | A1* | 6/2021 | MolavianJazi | H04L 1/0045 |
| 2023/0224840 | A1* | 7/2023 | Hu | H04W 74/0833 370/350 |
| 2023/0345474 | A1* | 10/2023 | Ma | H04L 5/0092 |
| 2024/0275467 | A1* | 8/2024 | Jang | H04B 7/0695 |
| 2025/0024294 | A1* | 1/2025 | Zhu | H04W 24/10 |

OTHER PUBLICATIONS

Mediatek Inc: "Enhancement on Multi-Beam Operation", 3GPP Draft, 3GPP TSG RAN WG1 #104-e, R1-2100588, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021 (Jan. 19, 2021), XP051971059, 27 Pages.

Qualcomm Incorporated: "Enhancements on Multi-Beam Operation", 3GPP Draft, 3GPP TSG RAN WG1 Meeting #104-e, R1-2101446, 3rd Generation Partnership Project (3GPP), Mobile Competence Centre, 650, Route Des Lucioles, F-06921 Sophia-Antipolis Cedex, France, vol. RAN WG1, No. Jan. 25, 2020-Feb. 5, 2020 Jan. 19, 2021 (Jan. 19, 2021), XP051971611, pp. 1-15.

Samsung: "Multi-Beam Enhancements", 3GPP Draft, 3GPP TSG RAN WG1 #104-e, R1-2101186, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 18, 2021 (Jan. 18, 2021), XP051971402, pp. 1-22.

* cited by examiner

RULES FOR DETERMINING AN APPLICATION TIME FOR A DOWNLINK CONTROL INFORMATION (DCI) BASED UPDATE

CROSS-REFERENCE TO RELATED APPLICATION(S)

This application claims benefit of and priority to U.S. Provisional Application No. 63/140,905, filed Jan. 24, 2021 which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for processing downlink control information (DCI)-based updates.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), TRP, etc. A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One or more aspects of the subject matter described in this disclosure can be implemented in a method for wireless communications by a user equipment (UE). The method generally includes receiving a downlink control information (DCI) indicating an update to be applied to at least one of an uplink (UL) transmission or a downlink (DL) transmission; determining an application time for applying the update based, at least in part, on one or more rules; and applying the update in accordance with the determined application time.

One or more aspects of the subject matter described in this disclosure can be implemented in a method for wireless communications by a network entity. The method generally includes transmitting, to a UE, a DCI indicating an update to be applied to at least one of an UL transmission or a DL transmission; determining an application time for applying the update based, at least in part, on one or more rules; and applying the update in accordance with the determined application time.

One or more aspects of the subject matter described in this disclosure can be implemented in a method for wireless communications by a UE. The method generally includes receiving a DCI indicating an update to be applied to at least one of a UL transmission or a DL transmission; determining an application time for applying the update based, at least in part, on a slot where an acknowledgement (ACK) was transmitted; and applying the update in accordance with the determined application time.

One or more aspects of the subject matter described in this disclosure can be implemented in a method for wireless communications by a network entity. The method generally includes transmitting, to a UE, a DCI indicating an update to be applied to at least one of an UL transmission or a DL transmission; determining an application time for applying the update based, at least in part, on a slot where an ACK was received; and applying the update in accordance with the determined application time.

One or more aspects of the subject matter described in this disclosure can be implemented in an apparatus for wireless communication by a UE. The apparatus generally includes a memory and at least one processor coupled with the memory. The at least one processor coupled with the memory is generally configured to receive a DCI indicating an update to be applied to at least one of an UL transmission or a DL transmission; determine an application time for applying the update based, at least in part, on one or more rules; and apply the update in accordance with the determined application time.

One or more aspects of the subject matter described in this disclosure can be implemented in an apparatus for wireless communication by a network entity. The apparatus generally includes a memory and at least one processor coupled with the memory. The at least one processor coupled with the memory is generally configured to transmit, to a UE, a DCI indicating an update to be applied to at least one of an UL transmission or a DL transmission; determine an application time for applying the update based, at least in part, on one or more rules; and apply the update in accordance with the determined application time.

One or more aspects of the subject matter described in this disclosure can be implemented in an apparatus for wireless communication by a UE. The apparatus generally includes a memory and at least one processor coupled with the memory. The at least one processor coupled with the memory is generally configured to receive a DCI indicating an update to be applied to at least one of an UL transmission or a DL transmission; determine an application time for applying the update based, at least in part, on a slot where an ACK was transmitted; and apply the update in accordance with the determined application time.

One or more aspects of the subject matter described in this disclosure can be implemented in an apparatus for wireless communication by a network entity. The apparatus generally includes a memory and at least one processor coupled with the memory. The at least one processor coupled with the memory is generally configured to transmit, to a UE, a DCI indicating an update to be applied to at least one of an UL transmission or a DL transmission; determine an application time for applying the update based, at least in part, on a slot where an ACK was received; and apply the update in accordance with the determined application time.

One or more aspects of the subject matter described in this disclosure can be implemented in an apparatus for wireless communication. The apparatus generally includes means for receiving signaling indicating a beam update. The apparatus generally includes means for receiving a DCI indicating an update to be applied to at least one of an UL transmission or a DL transmission; means for determining an application time for applying the update based, at least in part, on one or more rules; and means for applying the update in accordance with the determined application time.

One or more aspects of the subject matter described in this disclosure can be implemented in an apparatus for wireless communication. The apparatus generally includes means for signaling a UE an indication of a beam update. The apparatus generally includes means for transmitting, to a UE, a DCI indicating an update to be applied to at least one of an UL transmission or a DL transmission; means for determining an application time for applying the update based, at least in part, on one or more rules; and means for applying the update in accordance with the determined application time.

One or more aspects of the subject matter described in this disclosure can be implemented in an apparatus for wireless communication. The apparatus generally includes means for receiving signaling indicating a beam update. The apparatus generally includes means for receiving a DCI indicating an update to be applied to at least one of an UL transmission or a DL transmission; means for determining an application time for applying the update based, at least in part, on a slot where an ACK was received; and means for applying the update in accordance with the determined application time.

One or more aspects of the subject matter described in this disclosure can be implemented in an apparatus for wireless communication. The apparatus generally includes means for signaling a UE an indication of a beam update. The apparatus generally includes means for transmitting, to a UE, a DCI indicating an update to be applied to at least one of an UL transmission or a DL transmission; means for determining an application time for applying the update based, at least in part, on a slot where an ACK was received; and means for applying the update in accordance with the determined application time.

One or more aspects of the subject matter described in this disclosure can be implemented in a computer readable medium having computer executable code stored thereon. The computer readable medium having computer executable code stored thereon generally includes code for receiving signaling indicating a beam update. The computer readable medium having computer executable code stored thereon generally includes code for receiving a DCI indicating an update to be applied to at least one of an UL transmission or a DL transmission; code for determining an application time for applying the update based, at least in part, on one or more rules; and code for applying the update in accordance with the determined application time.

One or more aspects of the subject matter described in this disclosure can be implemented in a computer readable medium having computer executable code stored thereon. The computer readable medium having computer executable code stored thereon generally includes code for signaling a UE an indication of a beam update. The computer readable medium having computer executable code stored thereon generally includes code for transmitting, to a UE, a DCI indicating an update to be applied to at least one of an UL transmission or a DL transmission; code for determining an application time for applying the update based, at least in part, on one or more rules; and code for applying the update in accordance with the determined application time.

One or more aspects of the subject matter described in this disclosure can be implemented in a computer readable medium having computer executable code stored thereon. The computer readable medium having computer executable code stored thereon generally includes code for receiving signaling indicating a beam update. The computer readable medium having computer executable code stored thereon generally includes code for receiving a DCI indicating an update to be applied to at least one of an UL transmission or a DL transmission; code for determining an application time for applying the update based, at least in part, on a slot where an ACK was transmitted; and code for applying the update in accordance with the determined application time.

One or more aspects of the subject matter described in this disclosure can be implemented in a computer readable medium having computer executable code stored thereon. The computer readable medium having computer executable code stored thereon generally includes code for signaling a UE an indication of a beam update. The computer readable medium having computer executable code stored thereon generally includes code for transmitting, to a UE, a DCI indicating an update to be applied to at least one of an UL transmission or a DL transmission; code for determining an application time for applying the update based, at least in part, on a slot where an ACK was received; and code for applying the update in accordance with the determined application time.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
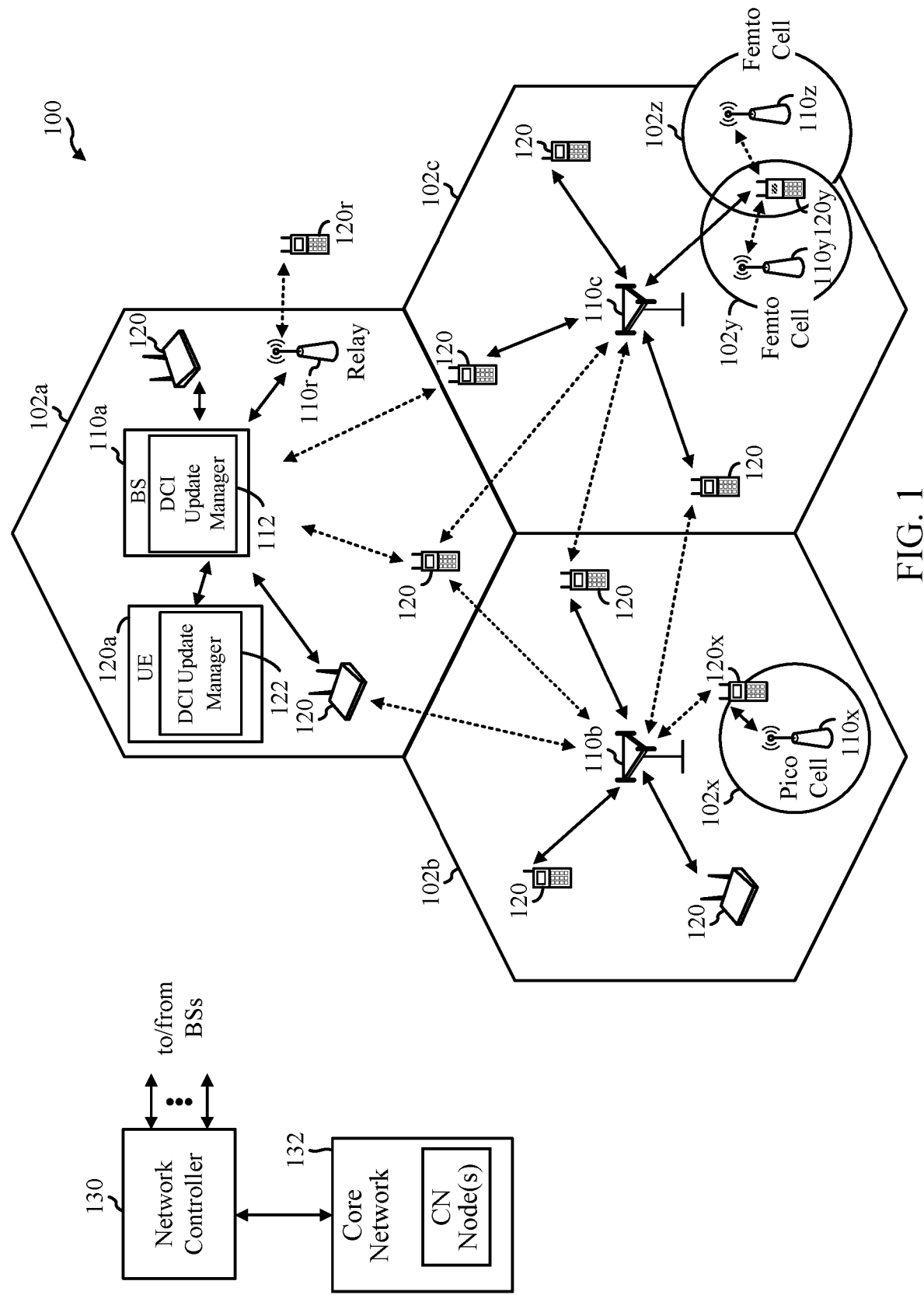
FIG. 1 is a block diagram conceptually illustrating an example wireless communication network, in accordance with certain aspects of the present disclosure.

Aspects of the present disclosure relate to wireless communications, and more particularly, to techniques for determining the application time of downlink control information (DCI)-based updates. Examples of such DCI-based updates include updates related to transmission power control parameters and/or beam-related updates.

Techniques presented herein may involve applying a set of rules, in certain cases, to determine the timing of when to apply certain updates received in DCI. These additional rules may be designed to avoid lengthy delays in application of the update(s), while still ensuring that a user equipment (UE) and a network entity (e.g., gNB) are synchronized with respect to the application of an update. For example, the techniques presented herein may help avoid situations where a UE and a network entity are using different beams for uplink (UL) and/or downlink (DL) transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine-type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communication Network

FIG. 1 illustrates an example wireless communication network 100 (e.g., a New Radio (NR)/5G network), in which aspects of the present disclosure may be performed. For example, wireless communication network 100 may include a user equipment (UE) 120 configured to perform operations 800 of FIG. 8 and/or operation 1300 of FIG. 13 for processing downlink control information (DCI)-based updates transmitted from a network entity (e.g., such as a base station (BS) 110a) (performing operations 900 of FIG. 9 and/or operation 1400 of FIG. 14). For example, UE 120a includes a DCI Update Manager 122 and BS 110a includes a DCI Update Manager 112. DCI Update Manager 122 and/or DCI Update Manager 112 may be configured for determining an application time for a DCI based update, in accordance with certain aspects of the present disclosure.

As illustrated in FIG. 1, wireless communication network 100 may include a number of BSs 110 and other network entities. BS 110 may be a station that communicates with UEs 120. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, BSs 110 may be interconnected to one another and/or to one or more other BSs 110 or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs 120 in a Closed Subscriber Group (CSG), UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, BSs 110a, 110b and 110c may be macro BSs 110 for macro cells 102a, 102b and 102c, respectively. BS 110x may be a pico BS 110 for pico cell 102x. BSs 110y and 110z may be femto BSs 110 for femto cells 102y and 102z, respectively. A BS 110 may support one or multiple (e.g., three) cells.

Wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE 120 that relays transmissions for other UEs 120. In the example shown in FIG. 1, a relay station 110r may communicate with BS 110a and UE 120r to facilitate communication between BS 110a and UE 120r. A relay station may also be referred to as a relay BS, a relay, etc.

Wireless communication network 100 may be a heterogeneous network that includes BSs 110 of different types, e.g., macro BS, pico BS, femto BS, relays, etc. These different types of BSs 110 may have different transmit power levels, different coverage areas, and different impacts on interference in wireless communication network 100. For example, macro BSs may have a high transmit power level (e.g., 20 Watts) whereas pico BSs, femto BSs, and relays may have a lower transmit power level (e.g., 1 Watt).

Wireless communication network 100 may support synchronous or asynchronous operation. For synchronous operation, BSs 110 may have similar frame timing, and transmissions from different BSs 110 may be approximately aligned in time. For asynchronous operation, BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs 110. Network controller 130 may communicate with the BSs 110 via a backhaul. BSs 110 may also communicate with one another (e.g., directly or indirectly) via wireless or wireline backhaul.

UEs 120 (e.g., 120x, 120y, etc.) may be dispersed throughout wireless communication network 100, and each UE 120 may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs 120 may be considered machine-type communication (MTC) devices or evolved MTC (eMTC) devices. MTC and eMTC UEs 120 include, for example, robots, drones, remote devices, sensors, meters, monitors, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE 120 and a serving BS 110, which is a BS 110 designated to serve the UE 120 on the DL and/or UL. A finely dashed line with double arrows indicates interfering transmissions between a UE 120 and a BS 110. Other lines show component to component (e.g., UE 120 to UE 120) communication options.

Figure 2:
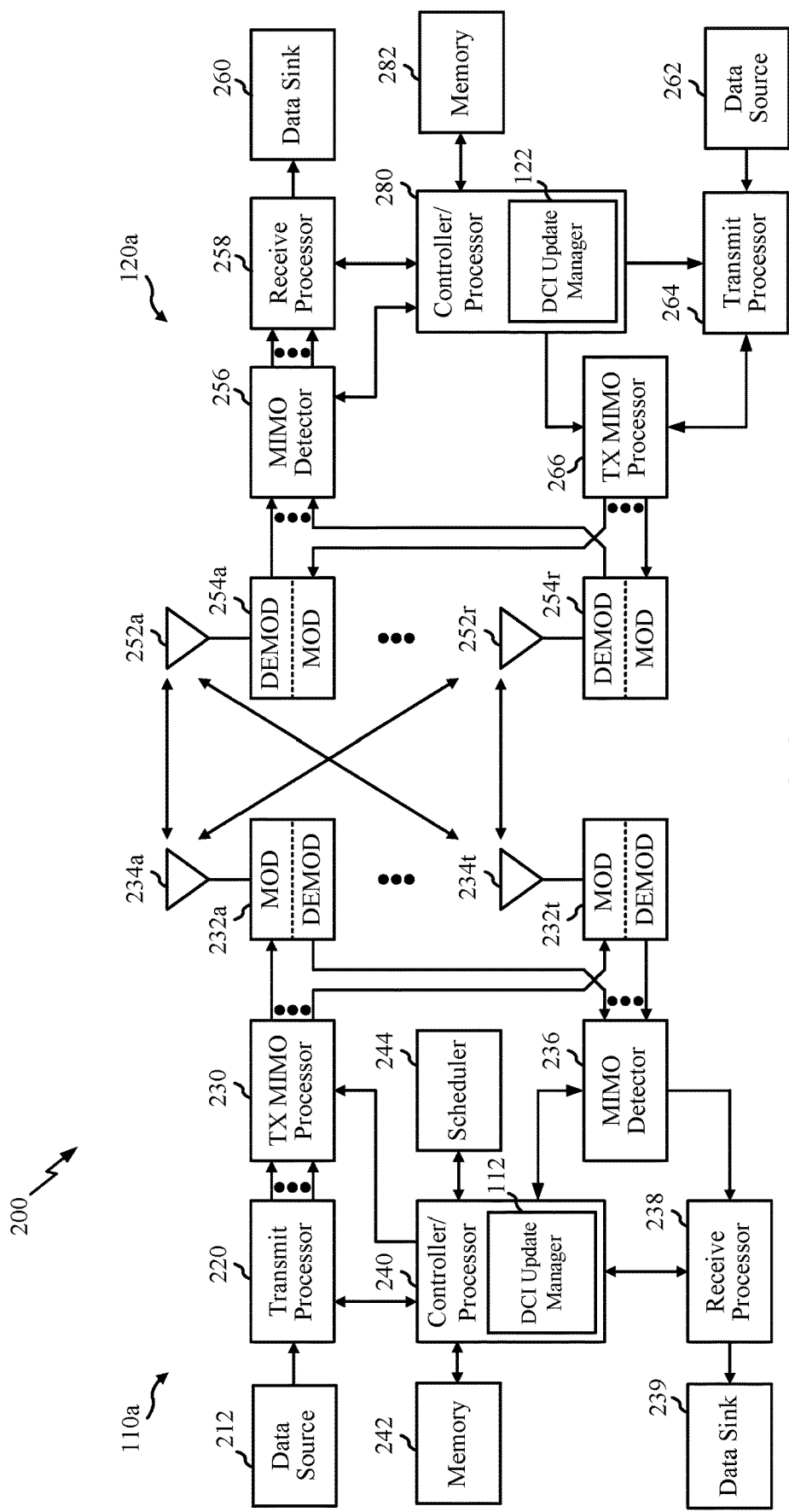
FIG. 2 is a block diagram conceptually illustrating a design of an example base station (BS) and an example user equipment (UE), in accordance with certain aspects of the present disclosure.

FIG. 2 illustrates example components of BS 110a and UE 120a (as depicted in FIG. 1) which may be used to implement aspects of the present disclosure. For example, antennas 252, processors 266, 258, 264, and/or controller/processor 280, which includes DCI Update Manager 122, of UE 120a may be used to perform operations 800 of FIG. 8 and/or operations 1300 of FIG. 13, while antennas 234, processors 220, 240, 238, and/or controller/processor 240, which includes DCI Update Manger 112, of BS 110a may be used to perform operations 900 of FIG. 9 and/or operations 1400 of FIG. 14.

At BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. Processor 220 may process (e.g., encode and symbol map) the data and control information to obtain data symbols and control symbols, respectively. Processor 220 may also generate reference symbols, e.g., for the primary synchronization signal (PSS), secondary synchronization signal (SSS), and cell-specific reference signal (CRS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At UE 120a, antennas 252a-252r may receive DL signals from BS 110a and may provide received signals to demodulators (DEMODs) in transceivers 254a-254r, respectively. Each demodulator in transceivers 254a-254r may condition (e.g., filter, amplify, down convert, and digitize) a respective received signal to obtain input samples. Each demodulator may further process input samples (e.g., for OFDM, etc.) to obtain received symbols. A MIMO detector 256 may obtain received symbols from all demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the UL, at UE 120a, transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (RS) (e.g., for the sounding reference signal (SRS)). The symbols from the transmit processor 264 may be precoded by a TX MIMO processor 266 if applicable, further processed by the demodulators in transceivers 254a-254r (e.g., for single-carrier frequency division multiplexing (SC-FDM), etc.), and transmitted to BS 110a. At BS 110a, UL signals from UE 120a may be received by the antennas 234, processed by the modulators 232, detected by a MIMO detector 236 if applicable, and further processed by receive processor 238 to obtain decoded data and control information sent by UE 120a. Receive processor 238 may provide the decoded data to a data sink 239 and the decoded control information to controller/processor 240.

Controllers/processors 240 and 280 may direct operations at BS 110a and UE 120a, respectively. Processor 240 and/or other processors and modules at BS 110a may perform or direct execution of processes for techniques described herein. Memories 242 and 282 may store data and program codes for BS 110a and UE 120a, respectively. A scheduler 244 may schedule UEs 120 for data transmission on the DL and/or UL.

Figure 3:
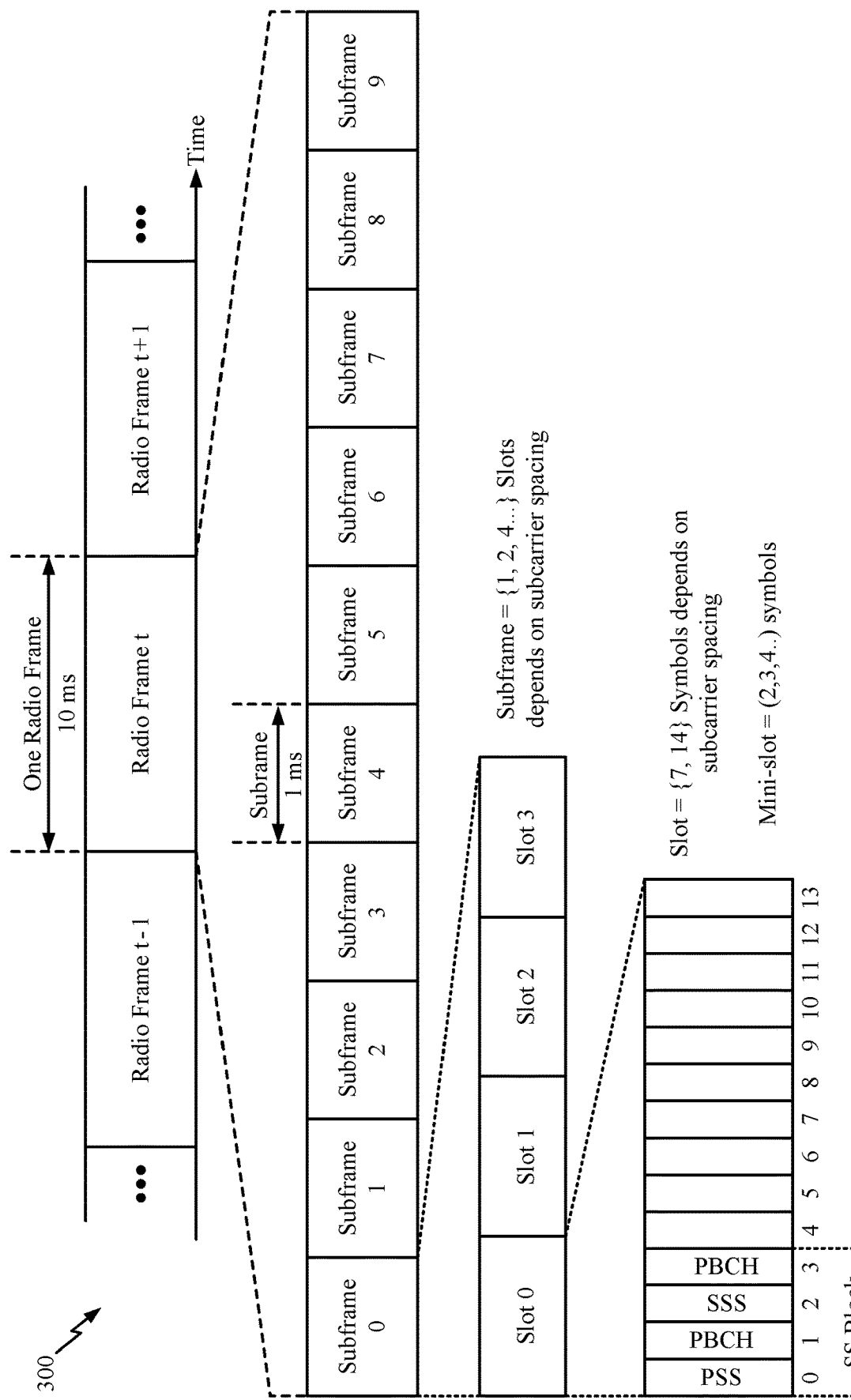
FIG. 3 illustrates an example of a frame format for a new radio (NR) system, in accordance with certain aspects of the present disclosure.

FIG. 3 illustrates an example of a frame format 300 for a new radio (NR) system, in accordance with certain aspects of the present disclosure. The transmission timeline for each of the DL and UL may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SSS may provide the CP length and frame timing. The PSS and SSS may provide the cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as an SS burst set. SSBs in an SS burst set may be transmitted in the same frequency region, while SSBs in different SS bursts sets can be transmitted at different frequency regions.

Figure 4:
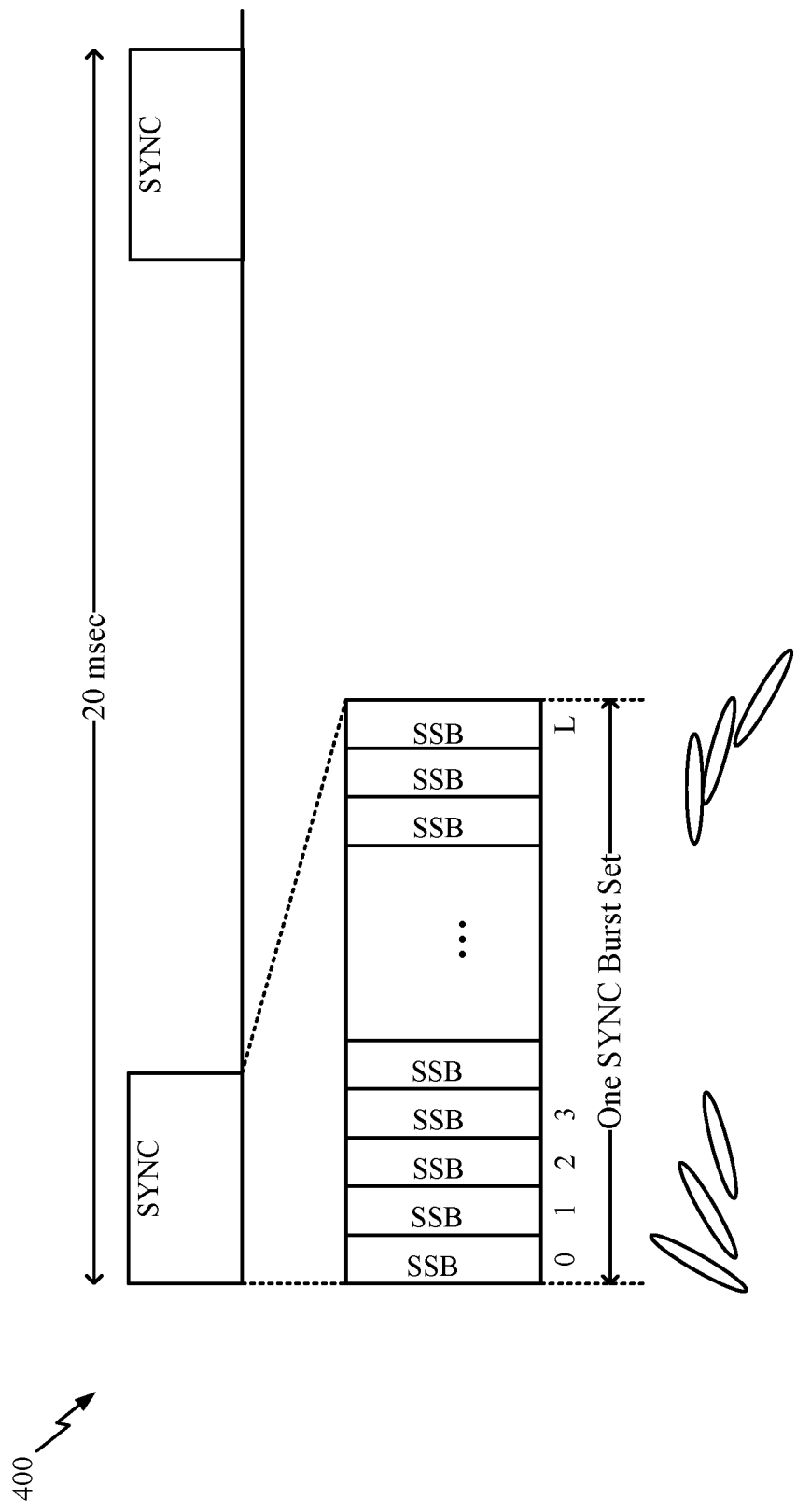
FIG. 4 is a diagram illustrating how different synchronization signal blocks (SSBs) may be sent using different beams, in accordance with certain aspects of the present disclosure.

FIG. 4 is a diagram 400 illustrating how different SSBs may be sent using different beams, in accordance with certain aspects of the present disclosure. As shown in FIG. 4, the SSBs may be organized into SS burst sets to support beam sweeping. As shown, each SSB within a burst set may be transmitted using a different beam, which may help a UE 120 quickly acquire both transmit (TX) and receive (RX) beams (particularly for millimeter wave (mmW) applications). A physical cell identity (PCI) may be decoded from the PSS and SSS of the SSB.

Certain deployment scenarios may include one or both NR deployment options. Some may be configured for a non-standalone (NSA) and/or a standalone (SA) option. A standalone cell may need to broadcast both SSB and RMSI, for example, with two SIBs (e.g., SIB1 and SIB2). A non-standalone cell may only need to broadcast SSB, without broadcasting RMSI. In a single carrier in NR, multiple SSBs may be sent in different frequencies, and may include the different types of SSBs.

Beam Management Procedures

Figure 5:
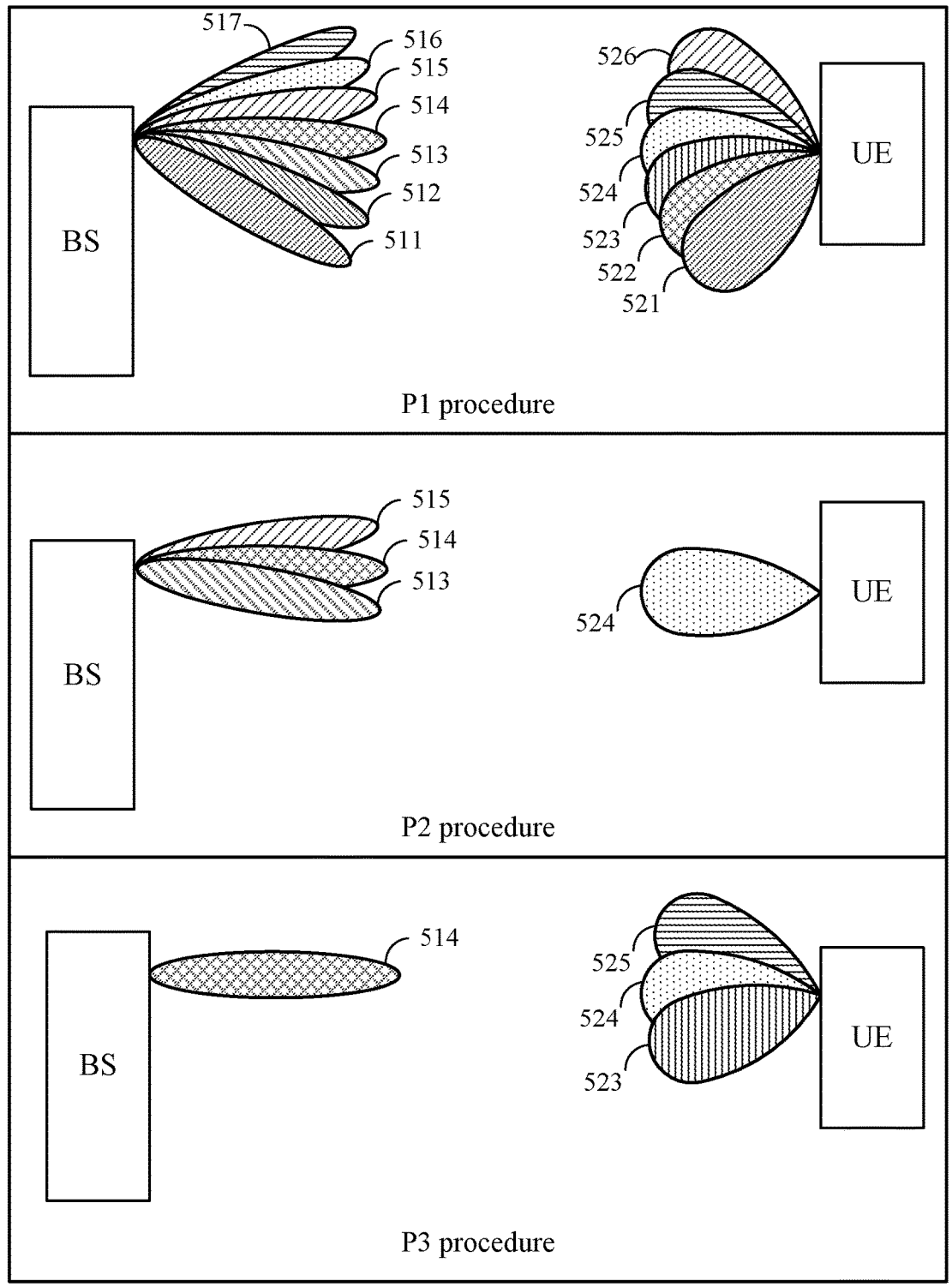
FIG. 5 illustrates example beam management procedures, in accordance with certain aspects of the present disclosure.

FIG. 5 illustrates example beam management procedures 500, in accordance with certain aspects of the present disclosure. As shown in FIG. 5, beam management procedures 500 may be divided into three phases: a P1 procedure, a P2 procedure, and a P3 procedure. In 5G New Radio (NR), the beam management procedure for determining beam pair links (BPLs) may be referred to as the P1 procedure. A base station (BS) (e.g., such as BS 110a illustrated in FIG. 1 and/or FIG. 2) may send a measurement request to a user equipment (UE) (e.g., such as UE 120a illustrated in FIG. 1 and/or FIG. 2) and may subsequently transmit one or more signals (sometimes referred to as the "P1-signal") to the UE for measurement. In the P1 procedure, the BS may transmit the signal with beam forming in a different spatial direction (corresponding to a transmit beam 511, 512, . . . , 517) in each symbol, such that several (e.g., most or all) relevant spatial locations of the cell of the BS are reached. In this manner, the BS may transmit the signal using different transmit beams over time in different directions. In some examples, a synchronization signal block (SSB) may be used as the P1-signal. In some examples, a channel state information reference signal (CSI-RS), a demodulation reference signal (DMRS), or another downlink (DL) signal may be used as the P1-signal.

In the P1 procedure, to successfully receive at least a symbol of the P1-signal, the UE may find (e.g., determine/select) an appropriate receive beam (521, 522, . . . , 526). Signals (e.g., SSBs) from multiple BSs may be measured simultaneously for a given signal index (e.g., SSB index) corresponding to a given time period. The UE may apply a different receive beam during each occurrence (e.g., each symbol) of the P1-signal. Once the UE succeeds in receiving a symbol of the P1-signal, the UE and BS may have discovered a BPL (i.e., the UE receive (RX) beam used to receive the P1-signal in the symbol and the BS transmit (TX) beam used to transmit the P1-signal in the symbol). In some cases, the UE may not search all of its possible UE RX beams until it finds the best UE RX beam, as this causes additional delay. Instead, the UE may select an RX beam once the RX beam is "good enough", for example, having a quality (e.g., signal to noise ratio (SNR) or signal to interference and noise ratio (SINR)) that satisfies a threshold (e.g., predefined threshold). The UE may not know which beam the BS used to transmit the P1-signal in a symbol; however, the UE may report to the BS the time at which it observed the signal. For example, the UE may report the symbol index in which the P1-signal was successfully received to the BS. The BS may receive this report and determine which BS TX beam the BS used at the indicated time. In some examples, the UE may measure signal quality of the P1-signal, such as reference signal receive power (RSRP) or another signal quality parameter (e.g., SNR, channel flatness, etc.). The UE may report the measured signal quality (e.g., RSRP) to the BS together with the symbol index. In some cases, the UE may report multiple symbol indices to the BS, corresponding to multiple BS TX beams.

As a part of a beam management procedure, the BPL used between a UE and BS may be refined/changed. For example, the BPL may be refined periodically to adapt to changing channel conditions, for example, due to movement of the UE or other objects, fading due to Doppler spread, etc. The UE may monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

As further shown in FIG. 5, for the P2 procedure, the BS may transmit symbols of a signal with different BS-beams (e.g., TX beams 515, 514, 513) that may be spatially close to the BS-beam of the current BPL. For example, the BS may transmit the signal in different symbols using neighboring TX beams (e.g., beam sweeps) around the TX beam of the current BPL. As shown in FIG. 5, the TX beams used by the BS for the P2 procedure may be different from the TX beams used by the BS for the P1 procedure. For example, the TX beams used by the BS for the P2 procedure may be spaced closer together and/or may be more focused (e.g., narrower) than the TX beams used by the BS for the P1 procedure. During the P2 procedure, the UE may keep its RX beam (e.g., RX beam 524) constant. The UE may measure the signal quality (e.g., RSRP) of the signal in the different symbols and indicate the symbol in which the highest signal quality was measured. Based on the indication, the BS may determine the strongest (e.g., best, or associated with the highest signal quality) TX beam (i.e., the TX beam used in the indicated symbol). The BPL may be refined accordingly to use the indicated TX beam.

As shown in FIG. 5, for the P3 procedure, the BS may maintain a constant TX beam (e.g., the TX beam of the current BPL) and transmit symbols of a signal using the constant TX beam (e.g., TX beam 514). During the P3 procedure, the UE may scan the signal using different RX beams (e.g., RX beams 523, 524, 525) in different symbols. For example, the UE may perform a sweep using neighboring RX beams to the RX beam in the current BPL (i.e., the BPL being refined). The UE may measure the signal quality (e.g., RSRP) of the signal for each RX beam and identify the strongest UE RX beam. The UE may use the identified RX beam for the BPL. The UE may report the signal quality to the BS.

Quasi Co-Location (QCL) Port and Transmission Configuration Indicator (TCI) States In many cases, it may be important for a user equipment (UE) to know which assumptions it may make on a channel corresponding to different transmissions. For example, the UE may need to know which reference signals (RSs) the UE may use to estimate the channel in order to decode a transmitted signal (e.g., physical downlink control channel (PDCCH) or physical downlink shared channel (PDSCH)). It may also be important for the UE to be able to report relevant channel state information (CSI) to a base station (BS) (or gNB) for scheduling, link adaptation, and/or beam management purposes. In New Radio (NR), the concept of quasi co-location (QCL) and transmission configuration indicator (TCI) states may be used to convey information about these assumptions.

QCL assumptions may be defined in terms of channel properties. Per 3rd Generation Partnership Project (3GPP) Technical Specification (TS) 38.214, "two antenna ports are said to be quasi-co-located if properties of the channel over which a symbol on one antenna port is conveyed can be inferred from the channel over which a symbol on the other antenna port is conveyed." Different RSs may be considered quasi co-located ("QCL'd") if a receiver (e.g., a UE) can apply channel properties determined by detecting a first reference signal (RS) to help detect a second RS. TCI states generally include configurations such as QCL-relationships, for example, between the downlink (DL) RSs in one CSI-RS set and the PDSCH demodulation reference signal (DMRS) ports.

In some cases, a UE may be configured with up to M TCI-States. Configuration of the M TCI-States may come about via higher layer signalling, while a UE may be signalled to decode PDSCH according to a detected PDCCH with downlink control information (DCI) indicating one of the TCI states. Each configured TCI state may include one RS set TCI-RS-SetConfig that indicates different QCL assumptions between certain source and target signals.

Figure 6:
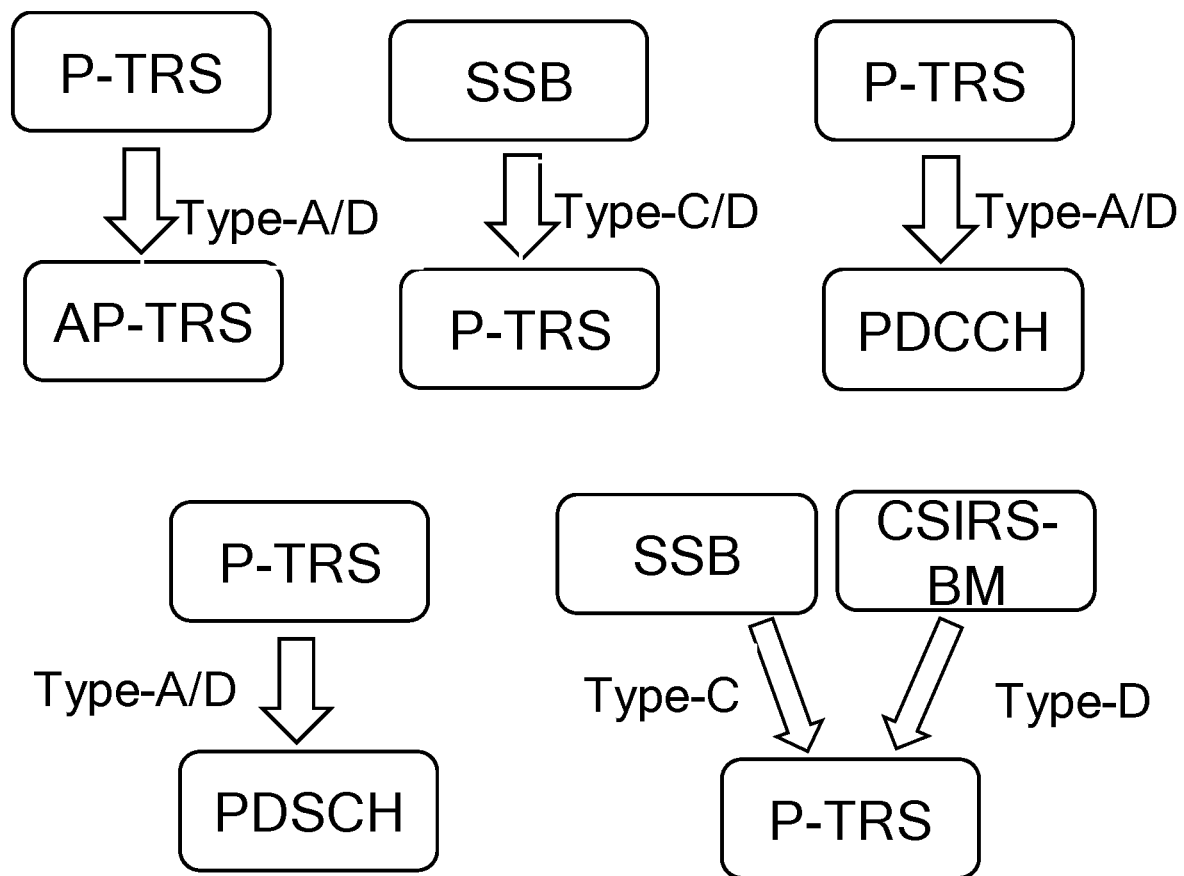
FIG. 6 illustrates example quasi co-location (QCL) relationships, in accordance with certain aspects of the present disclosure.

FIG. 6 illustrates example QCL relationships 600, in accordance with certain aspects of the present disclosure. More specifically, FIG. 6 illustrates examples of the association of DL RSs with corresponding QCL types that may be indicated by a TCI-RS-SetConfig.

In the example QCL relationships 600 of FIG. 6, a source RS may be indicated in the top block and may be associated with a target signal indicated in the bottom block. In this context, a target signal may refer to a signal for which channel properties may be inferred by measuring those channel properties for an associated source signal. As noted above, a UE may use the source RS to determine various channel parameters, depending on the associated QCL type. Further, the UE may use those various channel parameters (determined based on the source RS) to process the target signal. A target RS may not necessarily need to be a PDSCH's DMRS, rather it may be any other RS: a physical uplink shared channel (PUSCH) DMRS, a CSI-RS, a tracking reference signal (TRS), or a sounding reference signal (SRS).

As illustrated, each TCI-RS-SetConfig may contain parameters. These parameters may, for example, configure QCL relationship(s) between RSs in the RS set and the DMRS port group of the PDSCH. The RS set may contain a reference to either one or two DL RSs and an associated QCL-Type for each one configured by the higher layer parameter QCL-Type.

As illustrated in FIG. 6, for the case of two DL RSs, the QCL types may take on a variety of arrangements. For example, QCL types may not be the same, regardless of whether the references are to the same DL RSs or different DL RSs. In the illustrated example, an SSB may be associated with Type C QCL for phase tracking reference signal (PTRS), while CSI-RS for beam management (CSI-RS-BM) may be associated with Type D QCL.

QCL information and/or types may, in some scenarios, may depend on or be a function of other information. For example, the QCL types indicated to the UE may be based on higher layer parameter QCL-Type and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, and

QCL-TypeD: {Spatial Rx parameter},

Spatial QCL assumptions (QCL-TypeD) may be used to help a UE select an analog receive (RX) beam (e.g., during beam management procedures). For example, an SSB resource indicator may indicate a same beam for a previous RS should be used for a sub sequent transmission.

An initial Control Resource Set (CORESET) (e.g., CORESET ID 0 or simply CORESET #0) in NR may be identified during initial access by a UE (e.g., via a field in the MIB). A CORESET information element (IE), sent via radio resource control (RRC) signaling, may convey information regarding a CORESET configured for a UE. The CORESET IE may include a CORESET ID, an indication of frequency domain resources (e.g., number of resource blocks (RBs)) assigned to the CORESET, contiguous time duration of the CORESET in a number of symbols, and TCI states.

As noted above, a subset of the TCI states provide QCL relationships between DL RS(s) in one RS set (e.g., TCI-Set) and PDCCH DMRS ports. A particular TCI state for a given UE (e.g., for unicast PDCCH) may be conveyed to the UE via a Medium Access Control (MAC) Control Element (MAC-CE). The particular TCI state may be selected from the set of TCI states conveyed by the CORESET IE, with the initial CORESET (CORESET #0) generally configured via the MIB.

Search space information may also be provided via RRC signaling. For example, the Search Space IE may be another RRC IE that defines how and where to search for PDCCH candidates for a given CORESET. Each search space may be associated with one CORESET. The Search Space IE may identify a search space configured for a CORESET by a search space ID. In an aspect, the search space ID associated with CORESET #0 may be Search Space ID #0. The search space may be configured via PBCH (MIB).

Uplink (UL) Power Control (PC)

Transmit power of a physical uplink shared channel (PUSCH) may be computed by a user equipment (UE) prior to transmission, based on transmit power control parameters provided by the network. In wireless systems, one of the main challenges may include adapting the transmitting signal to overcome the variations of the wireless channel.

Thus, uplink (UL) power control (PC) generally refers to the ability of a transmitter UE to sets its output power in accordance with channel quality. For example, transmit power may be increased to meet a required signal-to-noise ratio (SNR) or bit error rate (BER) at a network entity (e.g., BS), while transmit power may be decreased to minimize co-channel interference of the 5G system. Two types of power controls include open loop power control and closed loop power control.

NR defines a PC equation for the transmit power ($P_{PUSCH}$) from a UE for PUSCH:

$$P_{PUSCH} = \min\left\{\begin{array}{c} P_{CMAX,f,c}(i), \\ P_{0_{PUSCH_{b_n},f,c}}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i) + f_{TF,b,f,c}(i,l) \end{array}\right\} [dBm]$$

As shown by the equation, UL power is a function of a path loss (PL) estimation, as well as other UL PC parameters (e.g., P0-PUSCH-AlphaSet). PL estimation is measured by a path loss reference signal (PL RS). PL may be either a synchronization signal block (SSB) or a channel state information (CSI) reference signal (RS) (CSI-RS).

In millimeter wave (mmW) application, different beamforming channels may have different PL. Accordingly, because each beamforming channel/beam may be indicated via a transmission configuration indictor (TCI) state (or spatial relationship information), different TCI states may need different PL RSs.

As indicated above, PL estimation is a parameter used in computing UL PC. Thus, to estimate PL, a UE may track configured PL RSs and determine UL PC of the corresponding UL channel using this estimation. Therefore, PL RSs may be needed more frequently than a TCI update. In 3GPP Release 15 and 16, however, PL RSs may only be updated in a Medium Access Control (MAC) Control Element (CE) (MAC-CE) or radio resource control (RRC) signaling.

Example Rules for Determining an Application Time for Downlink Control Information (DCI)-Based Updates Certain aspects of the present disclosure provide techniques for determining when to apply downlink control information (DCI)-based updates. As noted above, the techniques described herein may help a UE and network entity stay in-synch regarding various DCI-based updates.

For example, NR 3GPP Release 17 introduced various updates that may be transmitted to a user equipment (UE) via a DCI. These updates include a beam indication update and an uplink (UL) transmit (TX) power configuration update. The DCI-based beam indication update may include an update to a common beam transmission configuration indicator (TCI) state, as well as an update to a legacy TCI state. The DCI-based UL TX power configuration update may include an update to at least one of an UL power control (PC) parameter or a path loss (PL) reference signal (RS) used when calculating TX power for one or more UL transmissions. Where a UE and a network entity are to get out of synch on such updates, the UE and the network entity may use sub-optimal beams (or beam-pairs) or a UE may send uplink (UL) transmissions with sub-optimal transmit power.

Release 17 supports layer 1 (L1)-based beam indications using at least a UE-specific (unicast) DCI to indicate joint or separate DL/UL beam indications from the active TCI states. Three new types of TCI states that may be updated via a DCI (in Release 17 systems) include a joint downlink (DL)/UL common TCI state used to indicate a common beam for at least one DL channel/reference signal (RS) in addition to at least one UL channel/RS, a separate DL common TCI state to indicate a common beam for at least two DL channels/RSs, and a separate UL common TCI state to indicate a common beam for at least two UL channels/RSs.

Application time may be used to determine when the DCI-based indication/update may be applied. More specifically, the application time may be used to determine when an indicated, updated beam (e.g., TCI state) may be applied to a corresponding channel, when an updated PC parameter may be used to determine TX power in the UL channel, and/or when an updated PL RS may be used to estimate the PL for determining TX power in the UL channel.

According to aspects described herein, a UE may determine an application time of the received DCI-based update by selecting among different alternatives (e.g., alternative rules) used in computing the application time and determining the application time in accordance with the selection. In certain aspects, the application time may be determined as a function of a time delay relative to a starting point. Therefore, the various alternatives may define different starting points from which a time delay may be applied to determine the application time.

There are various alternatives for computing the application time (e.g., for applying an update) based on different starting points. For example, according to a first alternative, the starting point may be considered to be a slot in which the DCI was received. Thus, the update may be applied in a first slot that is at least X milliseconds (ms) or Y symbols after the DCI (e.g., the DCI with the joint or separate DL/UL beam indication). According to a second alternative, the starting point may be considered to be a slot where an acknowledgement (ACK) was transmitted in response to the DCI. With this alternative, the update may be applied in a first slot that is at least X ms or Y symbols after the ACK (e.g., ACK of the joint or separate DL/UL beam indication).

Currently defined alternatives for computing application times of the DCI-based updates may have potential disadvantages, however. One such disadvantage is illustrated in timing diagram 700 of FIG. 7.

Figure 7:
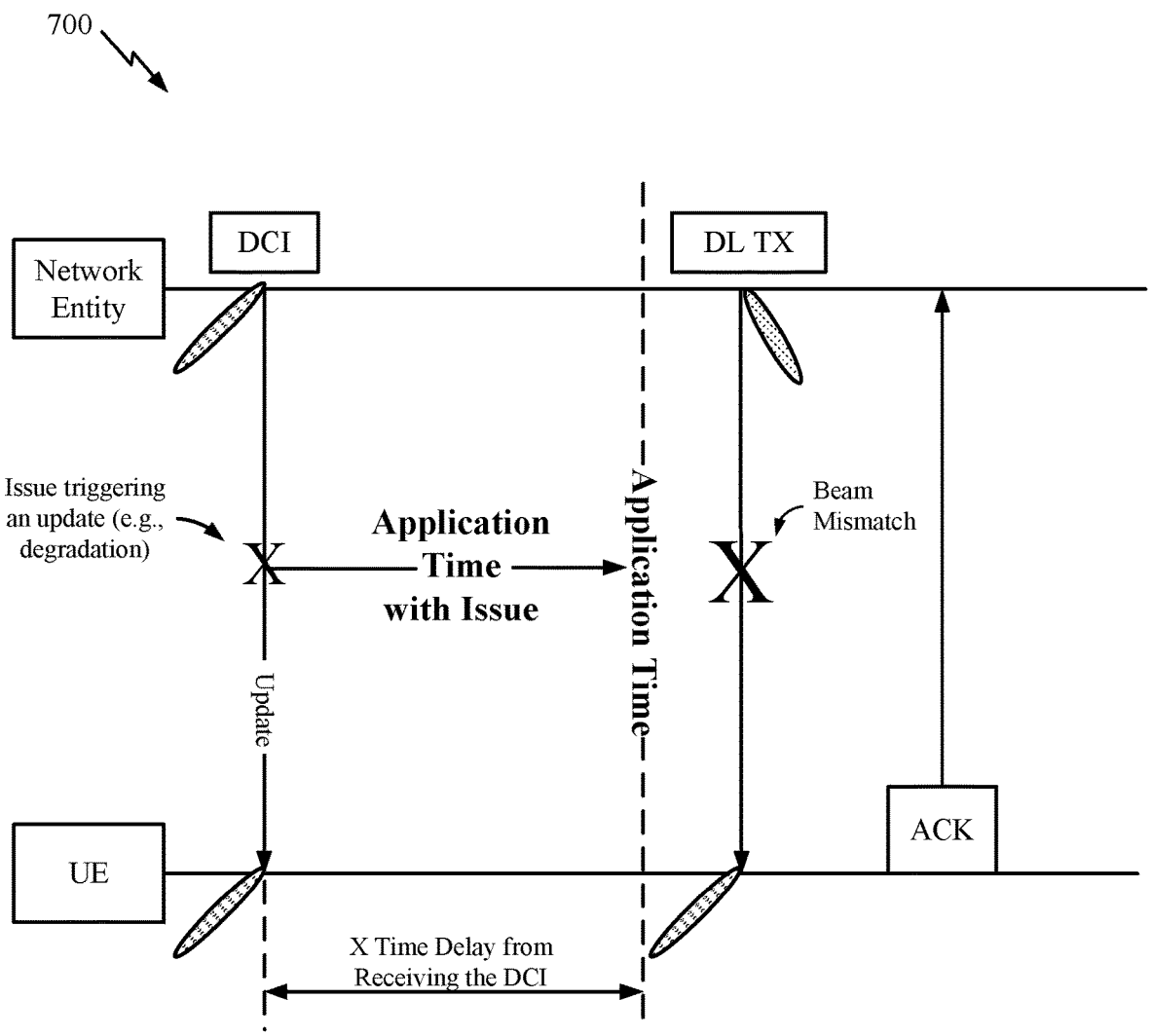
FIG. 7 is an example timing diagram illustrating a resulting beam mismatch when the application time is determined based as a function of a time delay relative to a slot in which a downlink control information (DCI) was received, in accordance with certain aspects of the present disclosure.

FIG. 7 is an example timing diagram 700 illustrating a resulting beam mismatch when the application time is determined based as a function of a time delay relative to a slot in which a DCI was received, in accordance with certain aspects of the present disclosure. As illustrated in timing diagram 700 of FIG. 7, in some examples, an application time may be calculated as a function of a time delay relative to a slot in which a DCI is received when using the first alternative. In other words, the application time may be X ms or Y symbols after the DCI. Because the application time is determined based on a slot where the DCI is received, the application time does not take into consideration timing of an ACK transmitted in response to DCI. As a result, in some cases (e.g., as illustrated by the example case in FIG. 7), the network entity may apply the update before it receives confirmation (via the ACK) that the UE has successfully received the DCI signaling the update. As a result, the UE and the network entity will be out of sync for future transmissions.

FIG. 7 illustrates an example where a UE and a network entity are out of sync as a result of determining an application time based on a slot where the DCI is received by a UE. In the example illustrated in FIG. 7, a beam update may be signaled to a UE via DCI (e.g., triggered by degradation of a current beam pair). If the network entity applies the beam update signaled in the DCI before the ACK is received for the DCI, in a case where the UE misses the update, a beam mismatch with the network may occur for a subsequent downlink (DL) transmission (as the UE maintains use of a previous beam after the network entity has switched to using the new beam indicated in the beam update).

Figure 8:
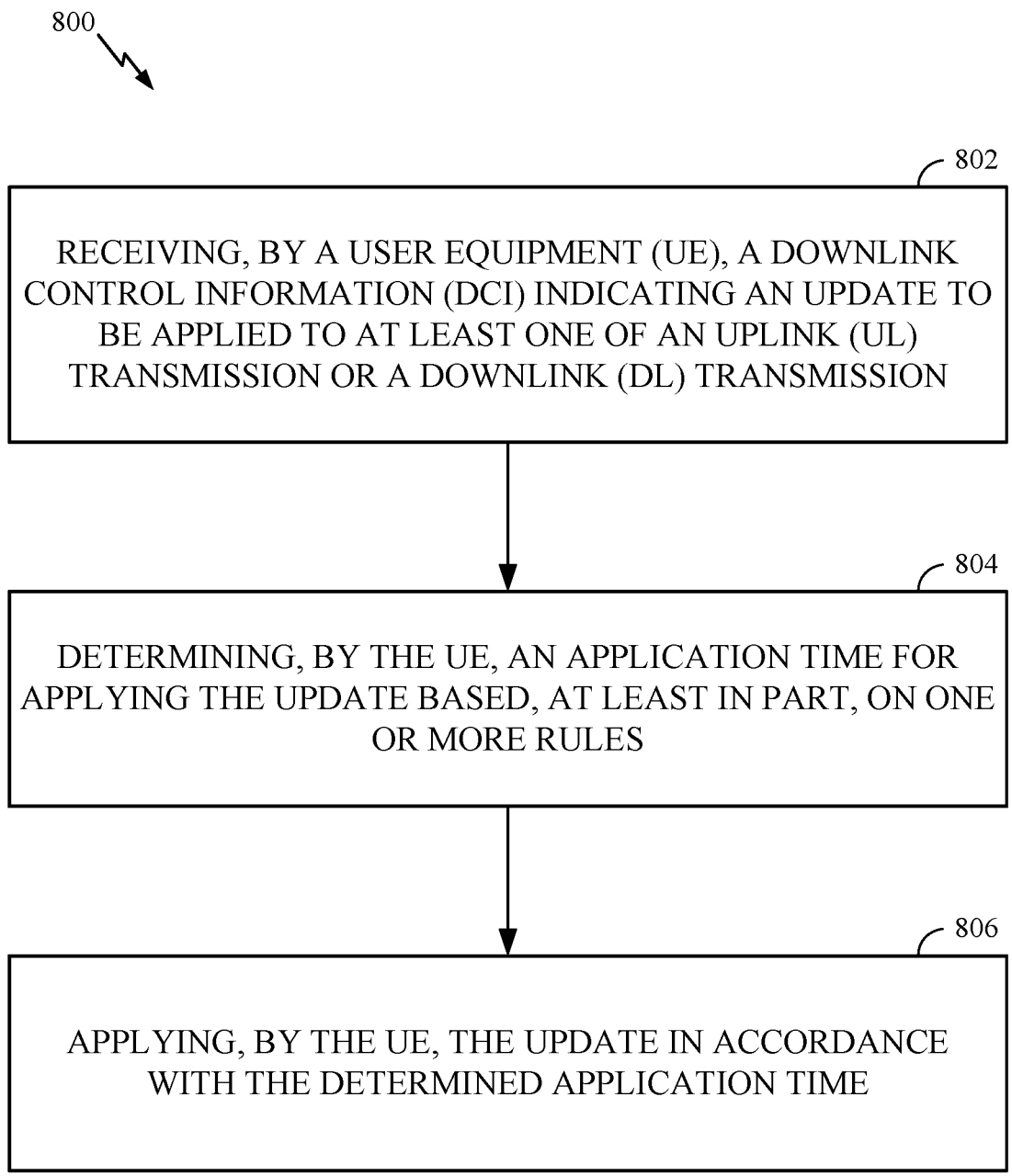
FIG. 8 is a flow diagram illustrating example operations for wireless communication by a UE, in accordance with certain aspects of the present disclosure.

Accordingly, aspects of the present disclosure provide rules for determining when a DCI-based update may be applied that may help address such scenarios and help to keep the network entity and the UE in-sync regarding such updates. The rules described herein include rules for applying updates relative to a DCI, as well as FIG. 8 is a flow diagram illustrating example operations 800 for wireless communication by a UE, in accordance with certain aspects of the present disclosure. Operations 800 may be performed, for example, by UE 120a in wireless communication network 100.

Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 begin, at block 802, by a UE receiving a DCI indicating an update to be applied to at least one of an UL transmission or a DL transmission.

At 804, the UE determines an application time for applying the update based, at least in part, on one or more rules. In certain aspects, according to a first one of the rules, the application time is determined as a function of a time delay relative to a slot in which the DCI was received. In certain aspects, according to a second one of the rules, the application time is determined as a function of a time delay relative to a slot where an ACK was transmitted.

At 806, the UE applies the update in accordance with the determined application time.

Figure 9:
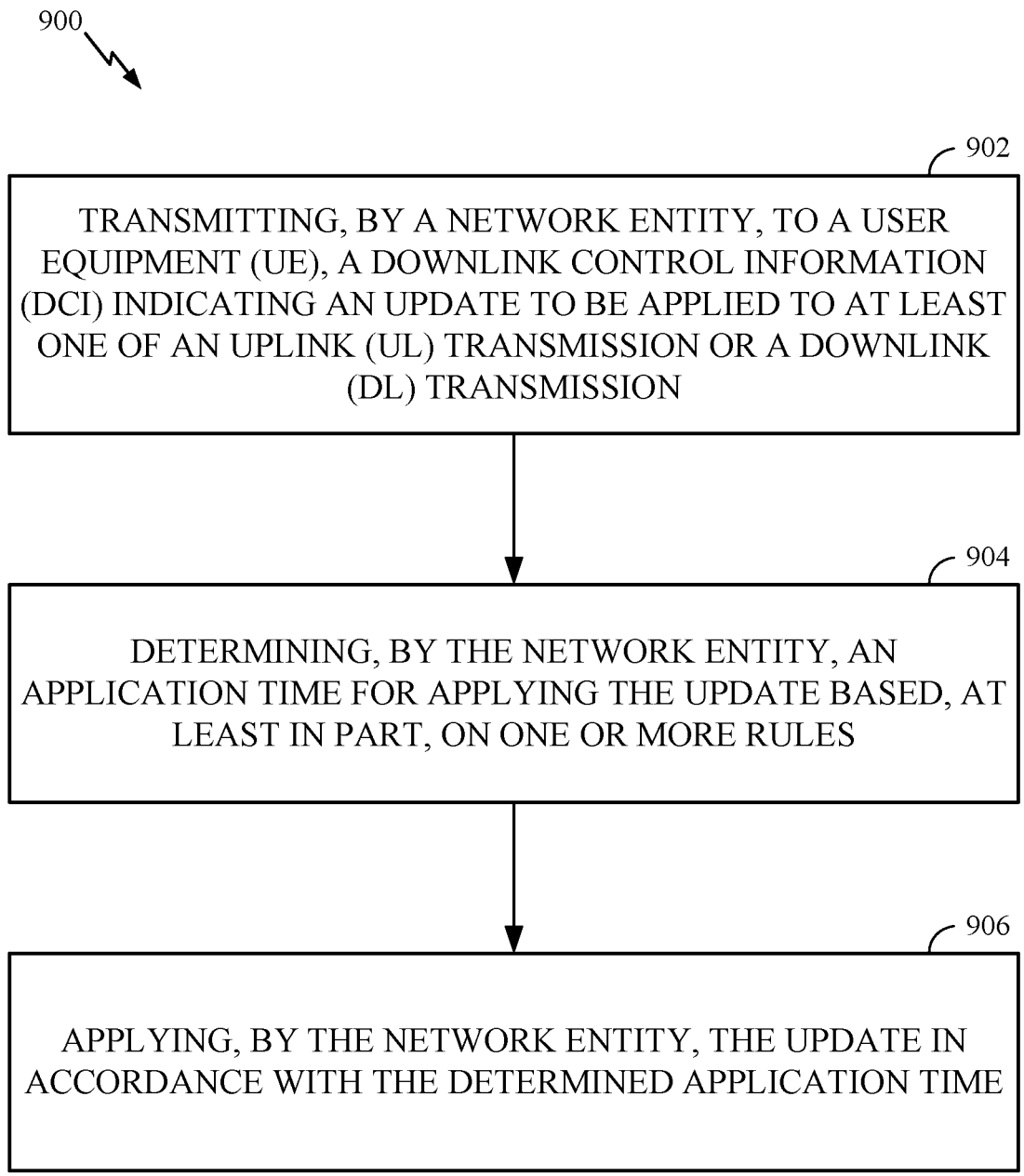
FIG. 9 is a flow diagram illustrating example operations for wireless communication by a network entity, in accordance with certain aspects of the present disclosure.

FIG. 9 is a flow diagram illustrating example operations 900 for wireless communication by a network entity. Operations 900 may be performed, for example, by a network entity, such as BS 110*a* in wireless communication network 100. Operations 900 may be considered complementary to operations 800 of FIG. 8.

Operations 900 may be implemented as software components that are executed and run on one or more processors (e.g., controller/processor 240 of FIG. 2). Further, the transmission and reception of signals by the network entity in operations 900 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 900 begin, at 902, by the network entity transmitting, to a UE, a DCI indicating an update to be applied to at least one of an UL transmission or a DL transmission.

At 904, the network entity determines an application time for applying the update based, at least in part, on one or more rules. In certain aspects, according to a first one of the rules, the application time is determined as a function of a time delay relative to a slot in which the DCI was received. In certain aspects, according to a second one of the rules, the application time is determined as a function of a time delay relative to a slot where an ACK was transmitted.

At 906, the network entity applies the update in accordance with the determined application time.

Figure 10:
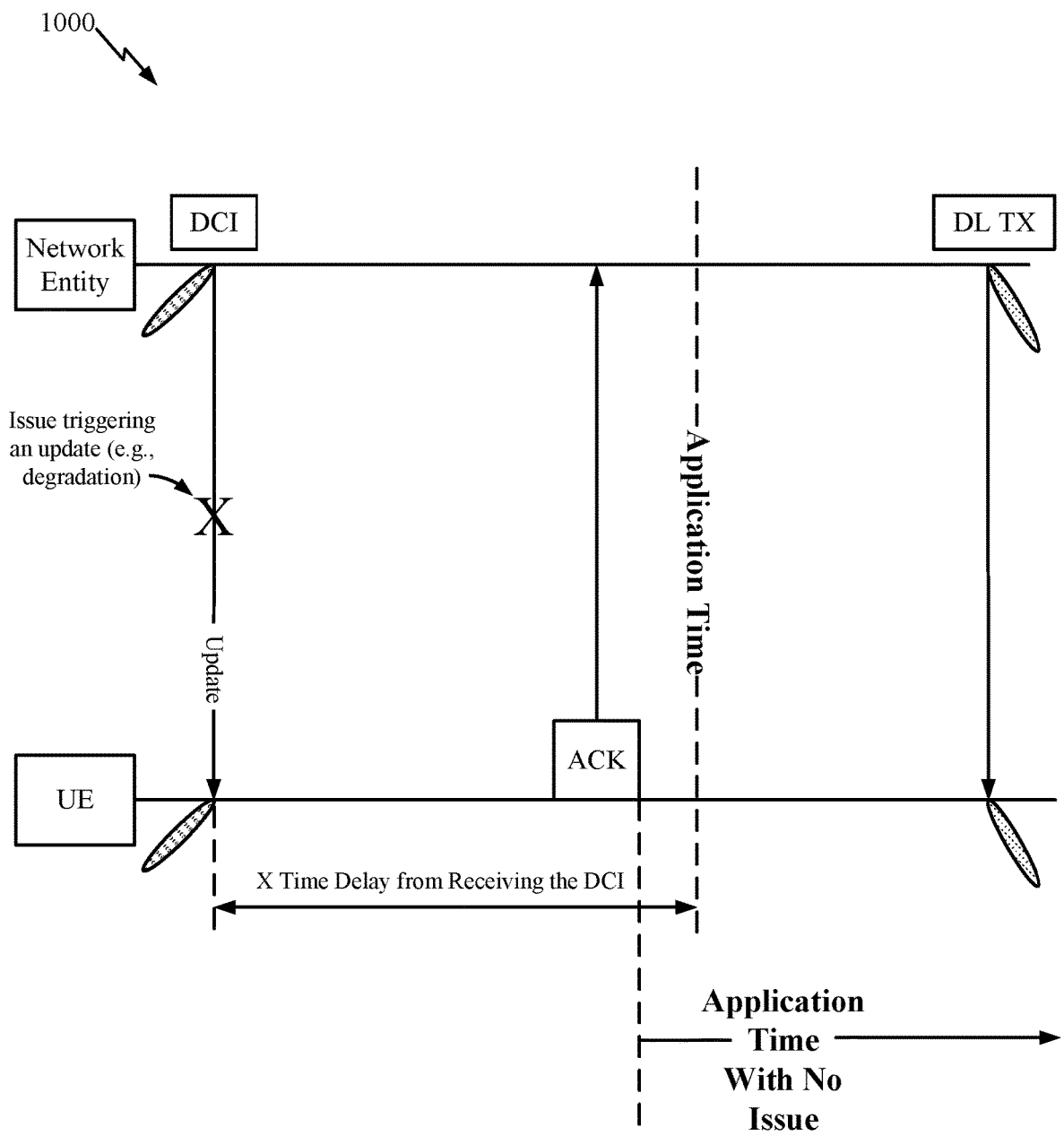
FIG. 10 is an example timing diagram enforcing additional rules when the application time is determined as a function of a time delay relative to a slot where DCI was received by a UE, in accordance with certain aspects of the present disclosure.

Operations 800 and 900 of FIGS. 8 and 9, respectively, may be understood with reference to the example timing diagram 1000 of FIG. 10. In particular, FIG. 10 is an example timing diagram 1000 enforcing additional rules in addition to enforcing a rule that the application time is determined as a function of a time delay relative to a slot where a DCI was received by a UE, in accordance with certain aspects of the present disclosure.

As shown in FIG. 10, the application time may be determined according to a first rule designed to ensure the application time for applying the DCI-based update is always later than the (expected) time of receiving an ACK. For example, according to the first rule, the time delay (X ms or Y symbols from/after the DCI) may be configured such that the application time is later than the expected time of an ACK transmitted in response to the DCI received by the UE. This may ensure the UE and network entity are in-sync regarding any update signaled by the DCI. In other words, the network entity may only apply the update where the network entity has assurance that the UE has received the update, as indicated by the ACK. Where the network entity does not receive the ACK, the network entity may not apply the update (and may re-signal the update).

In some examples, this time delay may be configured by a network entity. In some examples, this time delay may be based on a capability of the UE.

In some cases where the application time for applying the DCI-based update is not later than the time of receiving an ACK, the time between the time of application of the update and the ACK (e.g., time before the ACK and after the application time), the UE and network entity may apply a default configuration to one or more transmissions occurring during this time period, according to the first rule. Accordingly, the UE and the network entity may refrain from applying the update until the ACK is transmitted and, instead, use the default configuration during this period of time. In some examples, the configuration update may be to apply a new TCI state to replace an old TCI state in a channel or reference signal (RS). In some cases, when the application time is not later than the time of receiving an ACK in response to the DCI, the UE and network entity may apply the old (e.g., previously applied) TCI state for the channel or RS for a duration of time between the application time and the ACK and further apply the new TCI state to the channel or RS after the ACK is transmitted by the UE (or received by the network entity).

Figure 11A:
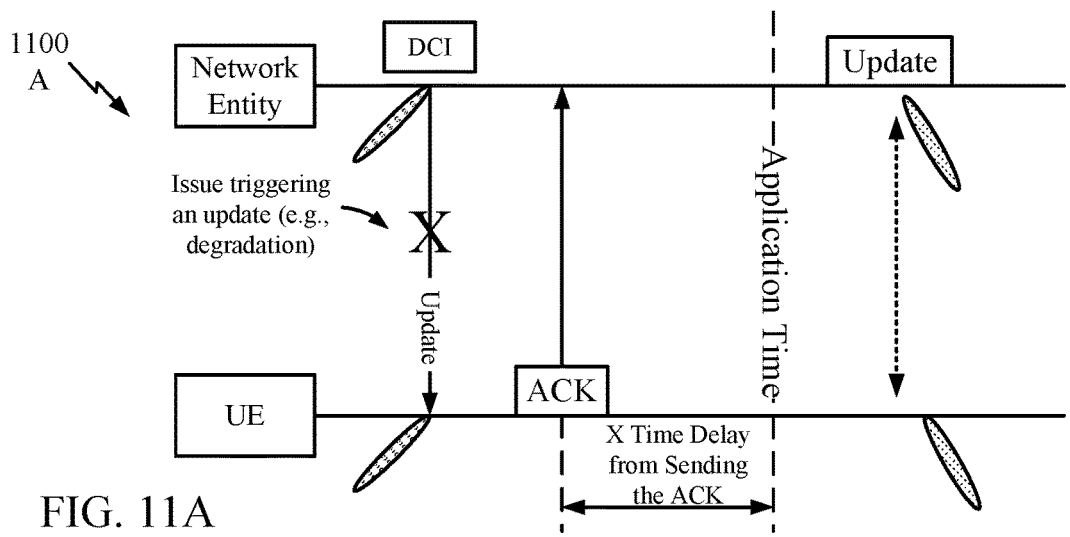
FIGS. 11A-11C are example timing diagrams illustrating the application of a DCI-based update when the application time is determined as a function of a time delay relative to a slot for which a dedicated ACK or a non-dedicated ACK is transmitted, in accordance with certain aspects of the present disclosure.
Figure 11B:
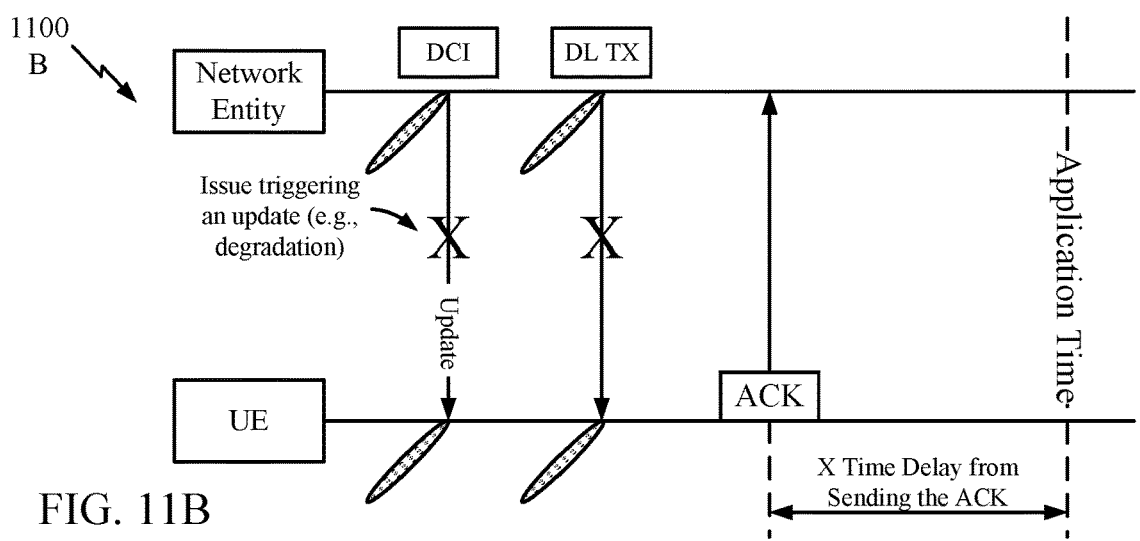
Figure 11C:
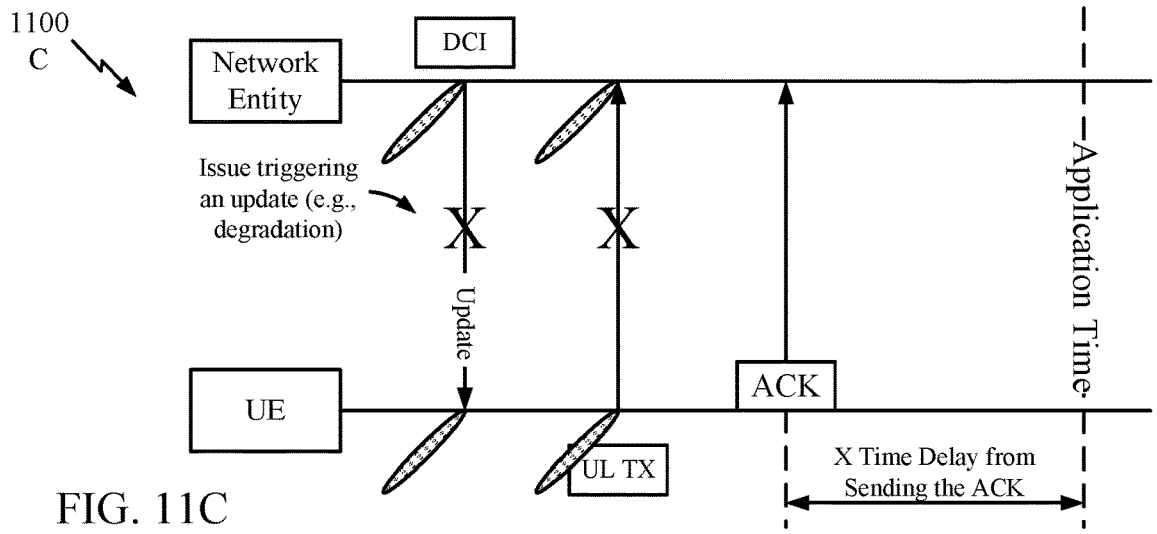

While FIG. 10 illustrates rules for determining the application time as a function of a time delay relative to a slot in which the DCI was received by the UE, FIGS. 11A-11C illustrate rules for determining the application time as a function of a time delay relative to a slot where an ACK was transmitted by the UE.

FIGS. 11A-11C are example timing diagrams 1100A-C, respectively illustrating the application of a DCI-based update when the application time is determined based as a function of a time delay relative to a slot for which a dedicated ACK or a non-dedicated ACK is transmitted, in accordance with certain aspects of the present disclosure. In certain aspects, the time between when the DCI is received (e.g., the last symbol where the DCI-based update is received) and the application time of the DCI-based update may be based, at least in part, on a capability of the UE (e.g., the application time shall satisfy the UE's capability).

The ACK illustrated in FIG. 11A is a dedicated ACK, while the ACK illustrated in each of FIGS. 11B and 11C is a non-dedicated ACK. As used herein, a dedicated ACK refers to a separate ACK sent for the DCI, while a non-dedicated ACK refers to an ACK sent for a scheduled transmission (e.g., a physical downlink shared channel (PDSCH), a physical uplink shared channel (PUSCH), etc.) scheduled by the DCI.

In particular, an ACK transmitted in response to a DCI may not be a dedicated ACK. For example, the ACK may be a non-dedicated ACK transmitted in response to a DL transmission scheduled by the DCI (e.g., a PDSCH), when the DCI has a DL DCI format (e.g., DCI format 1_0, 1_1, 1_2). As another example, the ACK may be a non-dedicated ACK transmitted as an UL transmission scheduled by the DCI (e.g., a PUSCH or a sounding reference signal (SRS)), when the DCI has a UL DCI format (e.g., DCI format 0_0, 0_1, 0_2). Accordingly, in such cases where the DCI schedules a transmission (e.g., an ACK is non-dedicated), the ACK may be scheduled in a later time.

As shown in timing diagram 1100A of FIG. 11A, in some cases, an ACK may be a dedicated ACK that is transmitted for a DCI. The dedicated ACK may be conveyed via a dedicated ACK bit in an uplink control information (UCI) when the DCI (e.g., existing or new) does not schedule a transmission. Accordingly, according to a second rule, the application time is a function of a time delay relative to a slot for which the dedicated ACK is transmitted by the UE.

In this case, according to a second rule, the dedicated ACK bit may be transmitted a period of time (Z) after an end of a physical downlink control channel (PDCCH) (e.g., last PDCCH symbol) carrying the DCI. The period of time (Z) may be based on tone spacing of a component carrier (CC) receiving the DCI and a CC sending the ACK (e.g., based on a subcarrier spacing (SCS) associated with a first CC on which the DCI was received and a second CC on which the ACK was transmitted).

Alternatively, as shown in timing diagrams 1100B and 1100C of FIGS. 11B and 11C, respectively, in some cases, an ACK may be a non-dedicated ACK, or in other words, an ACK transmitted in response to a transmission scheduled by the DCI. Accordingly, according to the second rules, the application is a function of a time delay relative to a slot for which the non-dedicated ACK is transmitted. However, where the application time is a function of a time delay relative to a slot in which a non-dedicated ACK is transmitted, a relatively long delay may result in applying the DCI-based update (e.g., due to the intervening DL/UL transmissions scheduled before the ACK), as illustrated in FIGS. 11B and 11C.

In particular, as shown in FIG. 11B, a DCI may schedule a DL transmission (PDSCH) after the DCI (e.g., four slots later) and the non-dedicated ACK to the PDSCH may be expected after that (e.g., two slots after the PDSCH). Thus, the application time (when the application time is a function of a time delay from the ACK) may be delayed (e.g., by a minimum of six slots in this example). Further, if the application time delay (X) after the ACK is determined to be six slots, the update may not be applied until twelve slots after the DCI (e.g., twelve slots after the UE receives the DCI). Waiting this amount of time to apply the update may be inefficient when the update could have been applied in much less time (e.g., eight slots).

As shown in FIG. 11C, a DCI may schedule a UL transmission (PUSCH) after the DCI, and a non-dedicated ACK to the PUSCH may be expected after that. Thus, the application time (when the application time is a function of a time delay from the ACK) may be delayed, similar to the example illustrated in example timing diagram 1100A.

In summary, when the ACK is sent in response to a scheduled transmission, the minimum application time for applying the update is at least a sum of a number of slots or symbols from the DCI to the scheduled transmission and a number of slots or symbols from the scheduled transmission to transmission of the ACK. This may, in some cases, cause a long delay in applying the update.

According to certain aspects, the application time may also be determined based on a third rule. According to the third rule, the application time for applying the DCI-based update may be determined as a later time among a first time and a second time. The first time may be determined as a function of a first time delay (time X) relative to a slot in which the DCI was received by the UE (e.g., time of receiving DCI plus time X), while the second time may be determined as a function of a second time delay (time Y) relative to a slot where an ACK was transmitted by the UE (e.g., time of sending ACK plus time Y).

Figure 12:
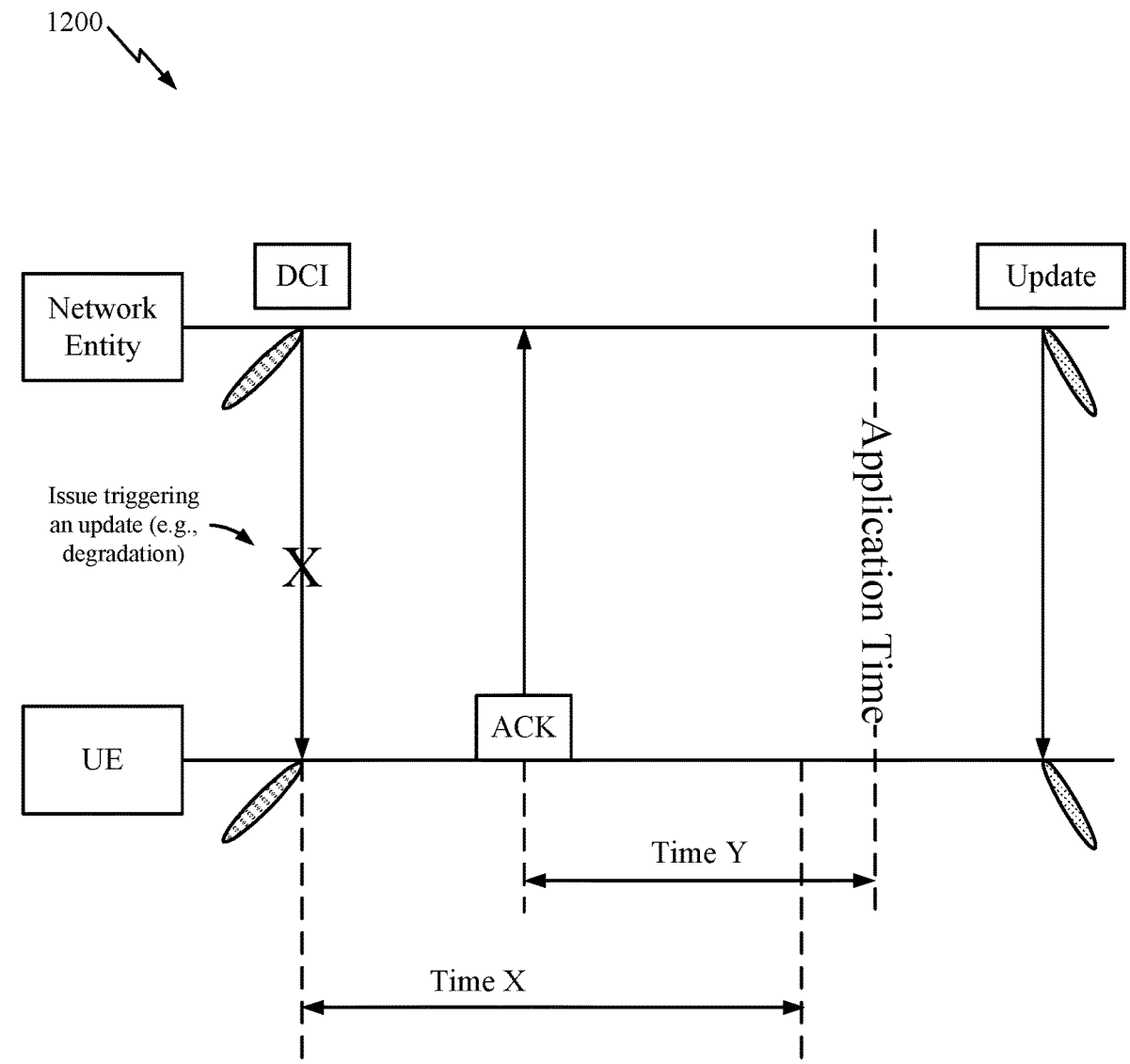
FIG. 12 is an example timing diagram where the application time, in accordance with a rule, is based on a first time relative to a slot in which a DCI is received and a second time relative to a slot in which an ACK is transmitted, in accordance with certain aspects of the present disclosure.

FIG. 12 is an example timing diagram 1200 where the application time, in accordance with a rule, is based on a first time relative to a slot in which a DCI is received and a second time relative to a slot in which an ACK is transmitted, in accordance with certain aspects of the present disclosure. As illustrated in timing diagram 1200 of FIG. 12, a first time delay (e.g., Time X) is X time after a slot where the DCI is received by the UE, while a second time delay (e.g., Time Y) is Y time after a slot where the ACK is transmitted by the UE. Because, in example timing diagram 1200, the time of second time delay (time of ACK plus time Y) is later in time than the time of the first time delay (time of DCI plus time X), the application time is based on the second time, according to the third rule.

In some examples, the first time delay (e.g., Time X) may be configured by the network entity. In some examples, the first time delay (e.g., tTime X) may be based on a capability of the UE.

In some examples, the second time delay (e.g., Time Y) may be zero. In some examples, the second time delay (e.g., Time Y) may be based on a capability of the UE. Accordingly, the UE may report its capability to the network entity, in some examples. In some examples, the second time delay (e.g., Time Y) may be based on a configuration of the network entity.

According to certain aspects, a UE may select which rule the UE may use in computing the application time because different rules may result in different application times (e.g., the application time may be shorter according to a first rule than according to a second rule). More specifically, the UE may select whether a first one of the rules is to be used in determining the application time, wherein according to the first rule, the application time is determined as a function of a time delay relative to a slot in which the DCI was received, whether a second one of the rules is to be used in determining the application time, wherein according to the second rule, the application time is determined as a function of a time delay relative to a slot where an ACK was transmitted, or a third one of the rules is to be used in determining the application time, wherein according to the third rule, the application time is determined as a later time among a first time and a second time, wherein the first time is determined as a function of a first time delay relative to a slot in which the DCI was received and the second time is determined as a function of a second time delay relative to a slot where an ACK was transmitted.

In some examples, the selection may be based on signaling from a network entity (e.g., radio resource control (RRC) signaling). In some examples, the selection may be based on an implicit rule. For example, the selection may be based on whether the ACK is a non-dedicated ACK or a dedicated ACK, based on a format of the DCI (e.g., a fallback DCI format may be more robust; therefore, such a format may be more likely to be missed by the UE), and/or may be based on tone spacing of a CC on which the DCI was received and a CC on which the update is to be applied. CCs with larger tone spacing may indicate smaller symbol time and therefore result in potentially shorter delays for determining the application time. Alternatives with longer delay may be okay for CCs with larger tone spacing.

According to certain aspects, the UE may report its capability, for example, by transmitting an indication of whether the UE supports dynamic selection, and if the UE does support dynamic selection, which rules the UE supports for selection (e.g., the first rule, the second rule, and/or the third rule).

Figure 13:
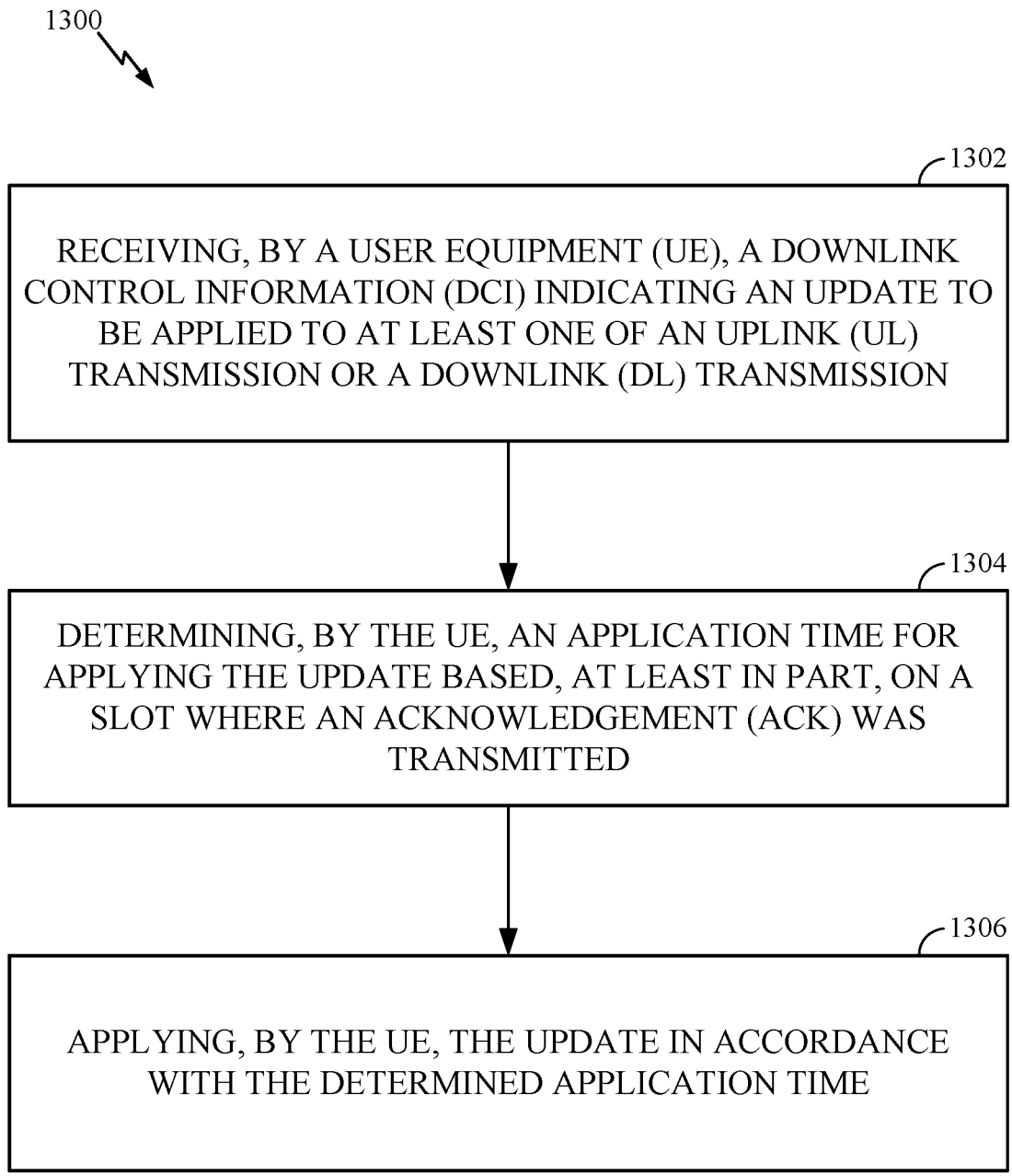
FIG. 13 is a flow diagram illustrating example operations for wireless communication by a UE, in accordance with certain aspects of the present disclosure.

FIG. 13 is a flow diagram illustrating example operations 1300 for wireless communication by a UE, in accordance with certain aspects of the present disclosure. Operations 1300 may be performed, for example, by UE 120a in wireless communication network 100.

Operations 1300 may be implemented as software components that are executed and run on one or more processors (e.g., controller/processor 280 of FIG. 2). Further, the transmission and reception of signals by the UE in operations 1300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 1300 begin, at block 1302, by a UE receiving a DCI indicating an update to be applied to at least one of an UL transmission or a DL transmission.

At 1304, the UE determines an application time for applying the update based, at least in part, on a slot where an ACK was transmitted. In certain aspects, determining the application time for applying the update based, at least in part, on the slot where the ACK was transmitted comprises determining the application time as a function of a time delay relative to the slot where the ACK was transmitted.

At 1306, the UE applies the update in accordance with the determined application time.

Figure 14:
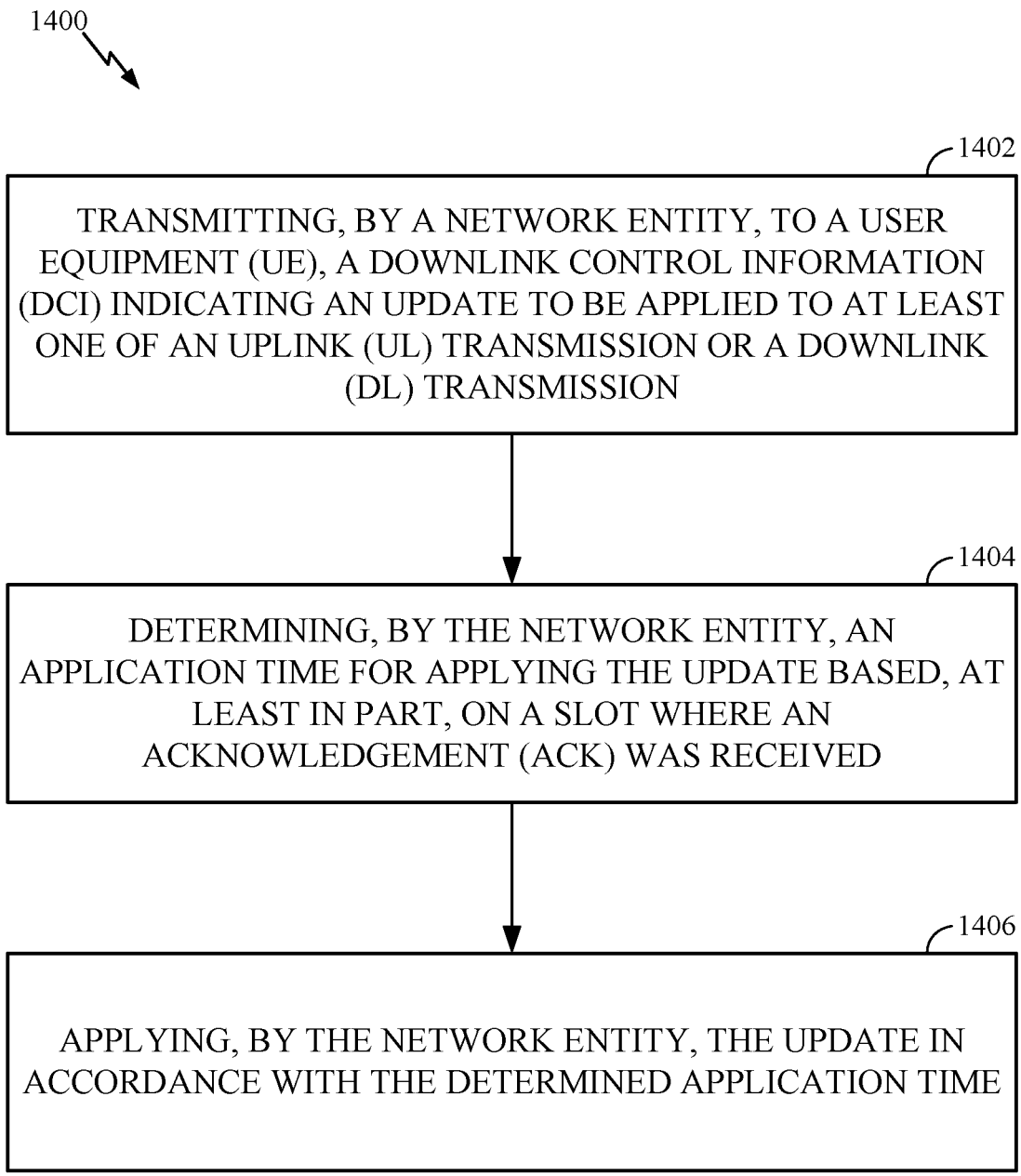
FIG. 14 is a flow diagram illustrating example operations for wireless communication by a network entity, in accordance with certain aspects of the present disclosure.

FIG. 14 is a flow diagram illustrating example operations 1400 for wireless communication by a network entity. Operations 1400 may be performed, for example, by a network entity, such as BS 110a in wireless communication network 100. Operations 1400 may be considered complementary to operations 1300 of FIG. 13.

Operations 1400 may be implemented as software components that are executed and run on one or more processors (e.g., controller/processor 240 of FIG. 2). Further, the transmission and reception of signals by the network entity in operations 1400 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 1400 begin, at 1402, by the network entity transmitting, to a UE, a DCI indicating an update to be applied to at least one of an UL transmission or a DL transmission.

At 1404, the network entity determines an application time for applying the update based, at least in part, on a slot where an ACK was received. In certain aspects, determining the application time for applying the update based, at least in part, on the slot where the ACK was transmitted comprises determining the application time as a function of a time delay relative to the slot where the ACK was received.

At 1406, the network entity applies the update in accordance with the determined application time.

Wireless Communications Devices

Figure 15:
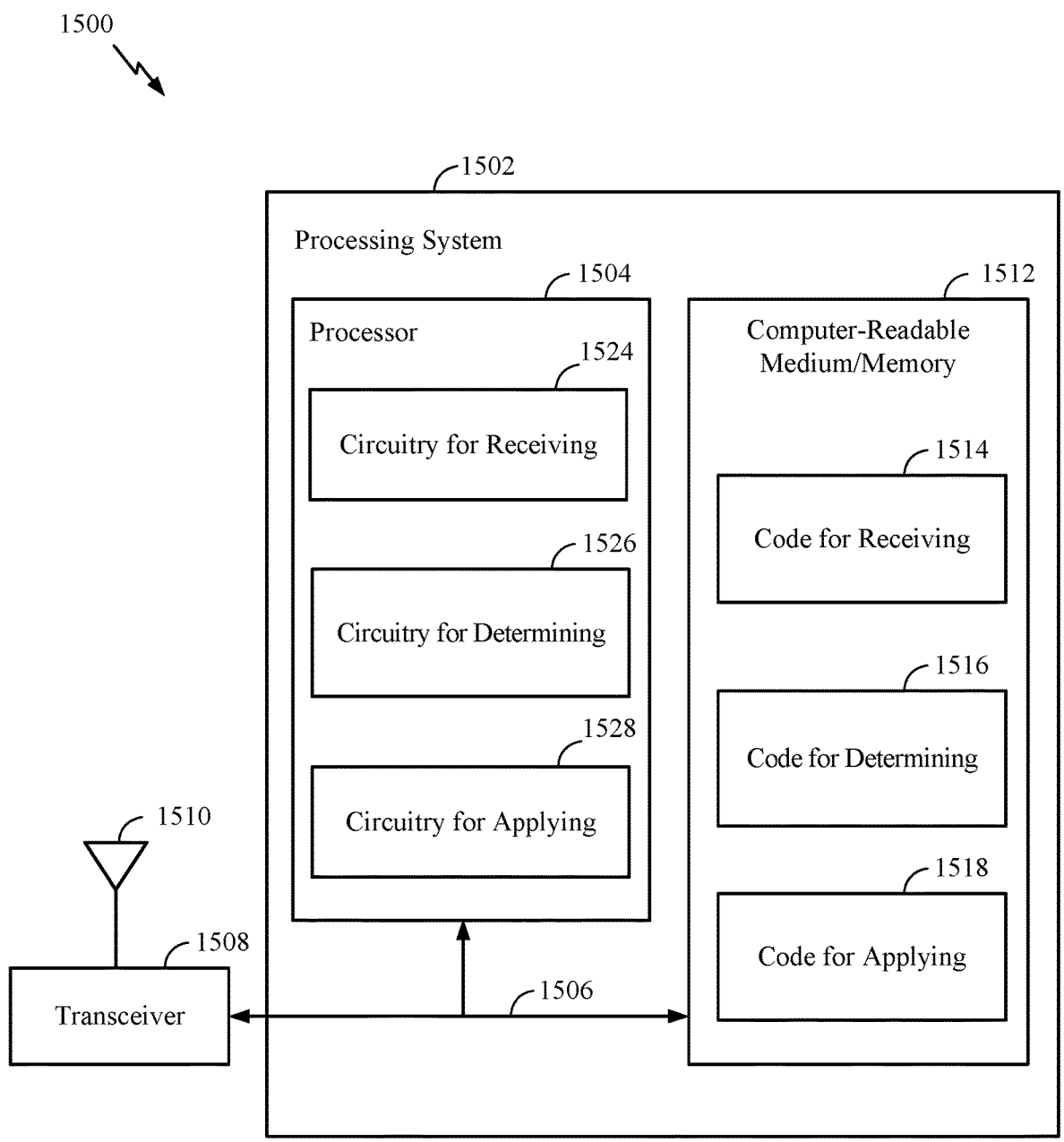
FIG. 15 illustrates a communications device that may include various components configured to perform operations for the techniques disclosed herein, in accordance with aspects of the present disclosure.

FIG. 15 illustrates a communications device 1500 that may include various components (e.g., corresponding to means-plus-function components) operable, configured, or adapted to perform operations for the techniques disclosed herein, such as the operations illustrated in FIG. 8 and/or FIG. 13. In some examples, communications device 1500 may be a user equipment (UE), such as UE 120a described with respect to FIGS. 1 and 2.

Communications device 1500 includes a processing system 1502 coupled to a transceiver 1508 (e.g., a transmitter and/or a receiver). Transceiver 1508 is configured to transmit and receive signals for the communications device 1500 via an antenna 1510, such as the various signals as described herein. Processing system 1502 may be configured to perform processing functions for the communications device 1500, including processing signals received and/or to be transmitted by the communications device 1500.

Processing system 1502 includes a processor 1504 coupled to a computer-readable medium/memory 1512 via a bus 1506. In certain aspects, computer-readable medium/memory 1512 is configured to store instructions (e.g., computer-executable code) that when executed by processor 1504, cause processor 1504 to perform the operations illustrated in FIG. 8 and/or FIG. 13, or other operations for performing the various techniques discussed herein for applying downlink control information (DCI)-based updates.

In certain aspects, computer-readable medium/memory 1512 stores code 1514 for receiving (e.g., for receiving a DCI indicating an update to be applied to at least one of an UL transmission or a DL transmission); code 1516 for determining (e.g., for determining an application time for applying the update based, at least in part, on one or more rules or for determining an application time for applying the update based, at least in part, on a slot where an acknowledgement (ACK) was transmitted or for determining the application time as a function of a time delay relative to the slot where the ACK was transmitted); and code 1518 for applying (e.g., for applying the update in accordance with the determined application time), etc.

In certain aspects, processor 1504 has circuitry configured to implement the code stored in the computer-readable medium/memory 1512. The processor 1504 includes circuitry 1524 for receiving (e.g., for receiving a DCI indicating an update to be applied to at least one of an UL transmission or a DL transmission); circuitry 1526 for determining (e.g., for determining an application time for applying the update based, at least in part, on one or more rules or for determining an application time for applying the update based, at least in part, on a slot where an ACK was transmitted or for determining the application time as a function of a time delay relative to the slot where the ACK was transmitted); and circuitry 1528 for applying (e.g., for applying the update in accordance with the determined application time), etc.

In some cases, the operations illustrated in FIG. 8 and/or FIG. 13, as well as other operations described herein, may be implemented by one or more means-plus-function components. For example, in some cases, such operations may be implemented by means for receiving, means for determining, and means for applying.

In some cases, means for determining and means for applying, includes a processing system, which may include one or more processors, such as receive processor 258, transmit processor 264, TX MIMO processor 266, and/or the controller/processor 280 of UE 120a illustrated in FIG. 2 and/or processing system 1502 of communications device 1500 in FIG. 15.

In some cases, means for receiving or means for obtaining includes a receiver (such as receive processor 258) or antenna(s) 252 of UE 120a illustrated in FIG. 2. Means for transmitting or means for outputting may include a transmitter (such as transmit processor 264) or antenna(s) 252 of UE 120a illustrated in FIG. 2.

Further, transceiver 1508 may provide a means for receiving or transmitting information. Information may be passed on to other components of communications device 1500. Antenna 1510 may correspond to a single antenna or a set of antennas. Transceiver 1508 may provide means for transmitting signals generated by other components of communications device 1500.

Notably, FIG. 15 is just one example, and many other examples and configurations of communications device 1500 are possible.

Figure 16:
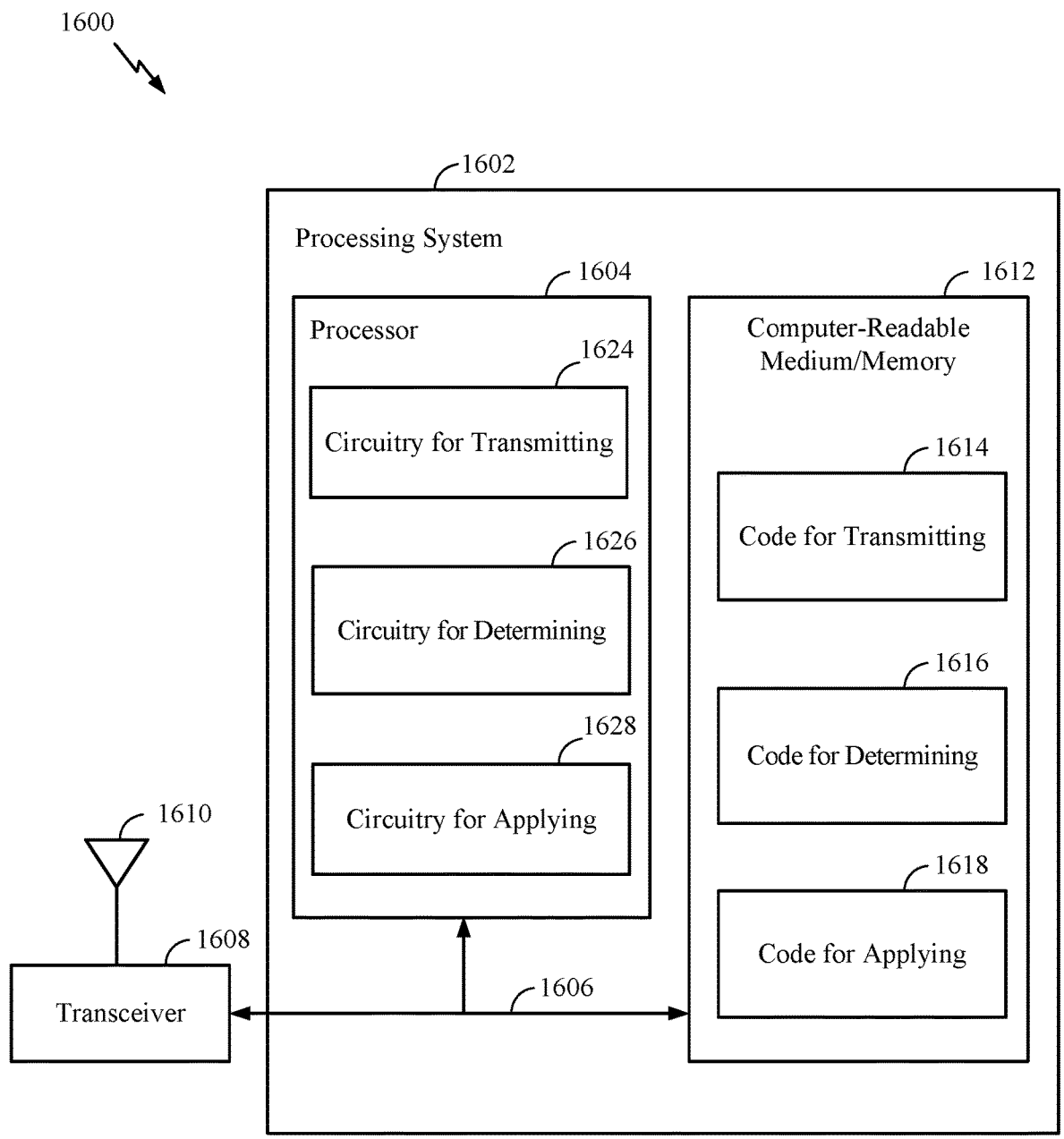
FIG. 16 illustrates a communications device that may include various components configured to perform operations for the techniques disclosed herein, in accordance with aspects of the present disclosure.

FIG. 16 illustrates a communications device 1600 that may include various components (e.g., corresponding to means-plus-function components) operable, configured, or adapted to perform operations for the techniques disclosed herein, such as the operations illustrated in FIG. 9 and/or FIG. 14. In some examples, communications device 1600 may be a network entity, such as base station (BS) 110*a* described with respect to FIGS. 1 and 2

Communications device 1600 includes a processing system 1602 coupled to a transceiver 1608 (e.g., a transmitter and/or a receiver). Transceiver 1608 is configured to transmit and receive signals for the communications device 1600 via an antenna 1610, such as the various signals as described herein. Processing system 1602 may be configured to perform processing functions for communications device 1600, including processing signals received and/or to be transmitted by the communications device 1600.

Processing system 1602 includes a processor 1604 coupled to a computer-readable medium/memory 1612 via a bus 1606. In certain aspects, computer-readable medium/memory 1612 is configured to store instructions (e.g., computer-executable code) that when executed by processor 1604, cause processor 1604 to perform the operations illustrated in FIG. 9 and/or FIG. 14, or other operations for performing the various techniques discussed herein for applying DCI-based updates.

In certain aspects, computer-readable medium/memory 1612 stores code 1614 for transmitting (e.g., for transmitting, to a UE, a DCI indicating an update to be applied to at least one of an UL transmission or a DL transmission); code 1616 for determining (e.g., for determining an application time for applying the update based, at least in part, on one or more rules or for determining an application time for applying the update based, at least in part, on a slot where an ACK was received or for determining the application time as a function of a time delay relative to the slot where the ACK was received); and code 1618 for applying (e.g., for applying the update in accordance with the determined application time), etc.

In certain aspects, processor 1604 has circuitry configured to implement the code stored in the computer-readable medium/memory 1612. Processor 1604 includes circuitry 1624 for transmitting (e.g., for transmitting, to a UE, a DCI indicating an update to be applied to at least one of an UL transmission or a DL transmission); circuitry 1626 for determining (e.g., for determining an application time for applying the update based, at least in part, on one or more rules or for determining an application time for applying the update based, at least in part, on a slot where an ACK was received or for determining the application time as a function of a time delay relative to the slot where the ACK was received); and circuitry 1628 for applying (e.g., for applying the update in accordance with the determined application time), etc.

In some cases, the operations illustrated in FIG. 9 and/or FIG. 14, as well as other operations described herein, may be implemented by one or more means-plus-function components. For example, in some cases, such operations may be implemented by means for transmitting, means for determining, and means for applying.

In some cases, means for determining and means for applying, includes a processing system, which may include one or more processors, such as receive processor 238, transmit processor 220, TX MIMO processor 230, and/or controller/processor 240 of BS 110*a* illustrated in FIG. 2 and/or processing system 1602 of communications device 1600 in FIG. 16.

In some cases, means for receiving or means for obtaining includes a receiver (such as receive processor 238) or antenna(s) 234 of BS 110*a* illustrated in FIG. 2. Means for transmitting or means for outputting may include a transmitter (such as transmit processor 220) or antenna(s) 234 of BS 110*a* illustrated in FIG. 2.

Further, transceiver 1608 may provide a means for receiving or transmitting information. Information may be passed on to other components of communications device 1600. Antenna 1610 may correspond to a single antenna or a set of antennas. Transceiver 1608 may provide means for transmitting signals generated by other components of communications device 1600.

Notably, FIG. 16 is just one example, and many other examples and configurations of communications device 1600 are possible.

DCI update manager 122 and DCI update manager 112 may support wireless communication in accordance with examples as disclosed herein.

DCI update manager 122 and DCI update manager 112 may be an example of means for performing various aspects described herein. DCI update manager 122 and DCI update manager 112, or its sub-components, may be implemented in hardware (e.g., in UL resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, DCI update manager 122 and DCI update manager 112, or its sub-components, may be implemented in code (e.g., as configuration management software or firmware) executed by a processor, or any combination thereof. If implemented in code executed by a processor, the functions of DCI update manager 122 and DCI update manager 112, or its sub-components may be executed by a general-purpose processor, a DSP, an ASIC, a FPGA or other programmable logic device.

In some examples, DCI update manager 122 and DCI update manager 112 may be configured to perform various operations (e.g., receiving, determining, transmitting/sending) using or otherwise in cooperation with the transceiver 1508 or 1608.

DCI update manager 122 and DCI update manager 112, or its sub-components, may be physically located at various positions, including being distributed such that portions of functions are implemented at different physical locations by one or more physical components. In some examples, DCI update manager 122 and DCI update manager 112, or its sub-components, may be a separate and distinct component in accordance with various aspects of the present disclosure. In some examples, DCI update manager 122 and DCI update manager 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Implementation examples are described in the following numbered aspects:

Aspect 1: A method for wireless communication by a user equipment (UE), comprising: receiving a downlink control information (DCI) indicating an update to be applied to at least one of an uplink (UL) transmission or a downlink (DL) transmission; determining an application time for applying the update based, at least in part, on one or more rules; and applying the update in accordance with the determined application time.

Aspect 2: The method of Aspect 1, wherein the update comprises an update to at least one of an UL power control (PC) parameter or a path loss (PL) reference signal (RS) used when calculating transmit power for one or more UL transmissions.

Aspect 3: The method of Aspect 1 or 2, wherein the update comprises an update to a transmission configuration indicator (TCI) state.

Aspect 4: The method of any of Aspects 1-3, wherein, according to at least a first one of the rules, the application time is determined as a function of a time delay relative to a slot in which the DCI was received.

Aspect 5: The method of Aspect 4, wherein, according to the first rule, the time delay is configured such that the application time is later than an expected time of an acknowledgement (ACK) transmitted in response to the received DCI.

Aspect 6: The method of Aspect 5, wherein the time delay is configured by a network entity.

Aspect 7: The method of Aspect 5 or 6, wherein the time delay is based, at least in part, on a capability of the UE.

Aspect 8: The method of any of Aspects 4-7, further comprising: applying a default configuration to one or more transmissions occurring between the application time and an acknowledgement (ACK) transmitted in response to the received DCI when, according to the first rule, the time delay is such that the application time is earlier than the ACK.

Aspect 9: The method of Aspect 8, wherein applying the default configuration comprises: refraining from applying the update until the ACK is transmitted; and using the default configuration during a time between the application time and the ACK transmission.

Aspect 10: The method of any of Aspects 1-9, wherein, according to at least a first one of the rules, the application time is determined as a function of a time delay relative to a slot where an acknowledgement (ACK) was transmitted.

Aspect 11: The method of Aspect 10, wherein the ACK comprises: a first non-dedicated ACK transmitted in response to a DL transmission scheduled by the DCI, when the DCI has a DL DCI format; or a second non-dedicated ACK transmitted as an UL transmission scheduled by the DCI, when the DCI has a UL DCI format.

Aspect 12: The method of Aspect 10 or 11, wherein: the ACK is conveyed via a dedicated ACK bit in an uplink control information (UCI) when the DCI does not schedule a transmission; and according to the first rule, the dedicated ACK bit is transmitted a period of time after an end of a physical downlink control channel (PDCCH) carrying the DCI.

Aspect 13: The method of Aspect 12, wherein the period of time is based, at least in part, on a subcarrier spacing (SCS) associated with a first component carrier (CC) on which the DCI was received and a second CC on which the ACK was transmitted.

Aspect 14: The method of any of Aspects 1-13, wherein according to at least a first one of the rules, the application time is determined as a later time among a first time and a second time, wherein: the first time is determined as a function of a first time delay relative to a slot in which the DCI was received; and the second time is determined as a function of a second time delay relative to a slot where an acknowledgement (ACK) was transmitted.

Aspect 15: The method of Aspect 14, wherein the first time delay is: configured by a network entity; or based, at least in part, on a capability of the UE.

Aspect 16: The method of Aspect 14 or 15, wherein the second time delay is: zero; or based, at least in part, on a configuration of a network entity.

Aspect 17: The method of any of Aspects 1-16, further comprising selecting whether: a first one of the rules is to be used in determining the application time, wherein according to the first rule, the application time is determined as a function of a time delay relative to a slot in which the DCI was received; a second one of the rules is to be used in determining the application time, wherein according to the second rule, the application time is determined as a function of a time delay relative to a slot where an acknowledgement (ACK) was transmitted; or a third one of the rules is to be used in determining the application time, wherein according to the third rule, the application time is determined as a later time among a first time and a second time, wherein the first time is determined as a function of a first time delay relative to a slot in which the DCI was received and the second time is determined as a function of a second time delay relative to a slot where an ACK was transmitted; and determining the application time in accordance with the selection.

Aspect 18: The method of Aspect 17, wherein the selection is based, at least in part, on at least one of: signaling from a network entity; whether the ACK comprises a non-dedicated ACK or a dedicated ACK; a format of the DCI; and a subcarrier spacing (SCS) associated with a first component carrier (CC) on which the DCI was received and a second CC on which the update is to be applied.

Aspect 19: The method of Aspect 18, further comprising transmitting an indication of a capability of the UE to support selection of at least one of the first rule, the second rule, and the third rule.

Aspect 20: A method for wireless communication by a network entity, comprising: transmitting, to a user equipment (UE), a downlink control information (DCI) indicating an update to be applied to at least one of an uplink (UL) transmission or a downlink (DL) transmission; determining an application time for applying the update based, at least in part, on one or more rules; and applying the update in accordance with the determined application time.

Aspect 21: The method of Aspect 20, wherein the update comprises an update to at least one of an UL power control (PC) parameter or a path loss (PL) reference signal (RS) used when calculating transmit power for one or more UL transmissions.

Aspect 22: The method of Aspect 20 or 21, wherein the update comprises an update to a transmission configuration indicator (TCI) state.

Aspect 23: The method of any of Aspects 20-22, wherein, according to at least a first one of the rules, the application time is determined as a function of a time delay relative to a slot in which the DCI was transmitted.

Aspect 24: The method of Aspect 23, wherein, according to the first rule, the time delay is configured such that the application time is later than an expected time of an acknowledgement (ACK) received in response to the transmitted DCI.

Aspect 25: The method of Aspect 24, further comprising configuring the time delay.

Aspect 26: The method of Aspect 24 or 25, wherein the time delay is based, at least in part, on a capability of the UE.

Aspect 27: The method of any of Aspects 23-26, further comprising: applying a default configuration to one or more transmissions occurring between the application time and an acknowledgement (ACK) received in response to the transmitted DCI when, according to the first rule, the time delay is such that the application time is earlier than the ACK.

Aspect 28: The method of Aspect 27, wherein applying the default configuration comprises: refraining from applying the update until the ACK is received; and using the default configuration during a time between the application time and the ACK transmission.

Aspect 29: The method of any of Aspects 20-28, wherein, according to at least a first one of the rules, the application time is determined as a function of a time delay relative to a slot where an acknowledgement (ACK) was received.

Aspect 30: The method of Aspect 29, wherein the ACK comprises: a first non-dedicated ACK received in response to a DL transmission scheduled by the DCI, when the DCI has a DL DCI format; or a second non-dedicated ACK received as an UL transmission scheduled by the DCI, when the DCI has a UL DCI format.

Aspect 31: The method of Aspect 29 or 30, wherein: the ACK is received via a dedicated ACK bit in an uplink control information (UCI) when the DCI does not schedule a transmission; and according to the first rule, the dedicated ACK bit is received a period of time after an end of a physical downlink control channel (PDCCH) carrying the DCI.

Aspect 32: The method of Aspect 31, wherein the period of time is based, at least in part, on a subcarrier spacing (SCS) associated with a first component carrier (CC) on which the DCI was transmitted and a second CC on which the ACK was received.

Aspect 33: The method of any of Aspects 20-32, wherein according to at least a first one of the rules, the application time is determined as a later time among a first time and a second time, wherein: the first time is determined as a function of a first time delay relative to a slot in which the DCI was transmitted; and the second time is determined as a function of a second time delay relative to a slot where an acknowledgement (ACK) was received.

Aspect 34: The method of Aspect 33, further comprising configuring the first time delay.

Aspect 35: The method of Aspect 33 or 34, wherein the first time delay is based, at least in part, on a capability of the UE.

Aspect 36: The method of any of Aspects 33-35, wherein the second time delay is: zero; or based, at least in part, on a configuration of a network entity.

Aspect 37: The method of any of Aspects 20-36, further comprising selecting whether: a first one of the rules is to be used in determining the application time, wherein according to the first rule, the application time is determined as a function of a time delay relative to a slot in which the DCI was transmitted; a second one of the rules is to be used in determining the application time, wherein according to the second rule, the application time is determined as a function of a time delay relative to a slot where an acknowledgement (ACK) was received; or a third one of the rules is to be used in determining the application time, wherein according to the third rule, the application time is determined as a later time among a first time and a second time, wherein the first time is determined as a function of a first time delay relative to a slot in which the DCI was transmitted and the second time is determined as a function of a second time delay relative to a slot where an ACK was received; and determining the application time in accordance with the selection.

Aspect 38: The method of Aspect 37, wherein the selection is based, at least in part, on at least one of: signaling sent to the UE; whether the ACK comprises a non-dedicated ACK or a dedicated ACK; a format of the DCI; and a subcarrier spacing (SCS) associated with a first component carrier (CC) on which the DCI was transmitted and a second CC on which the update is to be applied.

Aspect 39: The method of Aspect 37 or 38, further comprising receiving an indication of a capability of the UE to support selection of at least one of the first rule, the second rule, and the third rule.

Aspect 40: A method for wireless communication by a user equipment (UE), comprising: receiving a downlink control information (DCI) indicating an update to be applied to at least one of an uplink (UL) transmission or a downlink (DL) transmission; determining an application time for applying the update based, at least in part, on a slot where an acknowledgement (ACK) was transmitted; and applying the update in accordance with the determined application time.

Aspect 41: The method of Aspect 40, wherein the update comprises an update to at least one of an UL power control (PC) parameter or a path loss (PL) reference signal (RS) used when calculating transmit power for one or more UL transmissions.

Aspect 42: The method of Aspect 40 or 41, wherein the update comprises an update to a transmission configuration indicator (TCI) state.

Aspect 43: The method of any of Aspects 40-42, wherein determining the application time for applying the update based, at least in part, on the slot where the ACK was transmitted comprises determining the application time as a function of a time delay relative to the slot where the ACK was transmitted.

Aspect 44: The method of Aspect 43, wherein the time delay is based, at least in part, on a capability of the UE.

Aspect 45: The method of any of Aspects 40-44, wherein the ACK comprises a non-dedicated ACK transmitted in response to a DL transmission scheduled by the DCI, when the DCI has a DL DCI format.

Aspect 46: The method of any of Aspects 40-45, wherein the ACK comprises a non-dedicated ACK transmitted as an UL transmission scheduled by the DCI, when the DCI has a UL DCI format.

Aspect 47: The method of any of Aspects 40-46, wherein: the ACK is conveyed via a dedicated ACK bit in an uplink control information (UCI) when the DCI does not schedule a transmission; and the dedicated ACK bit is transmitted a period of time after an end of a physical downlink control channel (PDCCH) carrying the DCI.

Aspect 48: The method of Aspect 47, wherein the period of time is based, at least in part, on a subcarrier spacing (SCS) associated with a first component carrier (CC) on which the DCI was received and a second CC on which the ACK was transmitted.

Aspect 49: The method of any of Aspects 40-48, wherein determining the application time for applying the update based, at least in part, on the slot where the ACK was transmitted comprises determining the application time as a later time among a first time and a second time, wherein: the first time is determined as a function of a first time delay relative to a slot in which the DCI was received; and the second time is determined as a function of a second time delay relative to the slot where the ACK was transmitted.

Aspect 50: The method of Aspect 49, wherein the first time delay is: configured by a network entity; or based, at least in part, on a capability of the UE.

Aspect 51: The method of Aspect 49 or 50, wherein the second time delay is: zero; based, at least in part, on a capability of the UE; or based, at least in part, on a configuration of a network entity.

Aspect 52: The method of any of Aspects 40-51, further comprising selecting to: determine the application time as a function of a time delay relative to the slot where the ACK was transmitted; or determine the application time as a later time among a first time and a second time, wherein the first time is determined as a function of a first time delay relative to a slot in which the DCI was received and the second time is determined as a function of a second time delay relative to the slot where the ACK was transmitted; and determining the application time in accordance with the selection.

Aspect 53: The method of Aspect 52, wherein the selection is based, at least in part, on at least one of: signaling from a network entity; whether the ACK comprises a non-dedicated ACK or a dedicated ACK; a format of the DCI; and a subcarrier spacing (SCS) associated with a first component carrier (CC) on which the DCI was received and a second CC on which the update is to be applied.

Aspect 54: The method of Aspect 53, further comprising transmitting an indication of a capability of the UE to support selection of at least one of: determining the application time as the function of the time delay relative to the slot where the ACK was transmitted; and determining the application time as the later time among the first time and the second time, wherein the first time is determined as the function of the first time delay relative to the slot in which the DCI was received and the second time is determined as the function of the second time delay relative to the slot where the ACK was transmitted.

Aspect 55: A method for wireless communication by a network entity, comprising: transmitting, to a user equipment (UE), a downlink control information (DCI) indicating an update to be applied to at least one of an uplink (UL) transmission or a downlink (DL) transmission; determining an application time for applying the update based, at least in part, on a slot where an acknowledgement (ACK) was received; and applying the update in accordance with the determined application time.

Aspect 56: The method of Aspect 55, wherein the update comprises an update to at least one of an UL power control (PC) parameter or a path loss (PL) reference signal (RS) used when calculating transmit power for one or more UL transmissions.

Aspect 57: The method of Aspect 56, wherein the update comprises an update to a transmission configuration indicator (TCI) state.

Aspect 58: The method of any of Aspects 54-47, wherein determining the application time for applying the update based, at least in part, on the slot where the ACK was received comprises determining the application time as a function of a time delay relative to the slot where the ACK was received.

Aspect 59: The method of Aspect 58, further comprising: receiving an indication of a capability of the UE, wherein the time delay is based, at least in part, on the capability of the UE.

Aspect 60: The method of Aspect 58 or 59, wherein the ACK comprises a non-dedicated ACK received in response to a DL transmission scheduled by the DCI, when the DCI has a DL DCI format.

Aspect 61: The method of any of Aspects 58-60, wherein the ACK comprises a non-dedicated ACK received as an UL transmission scheduled by the DCI, when the DCI has a UL DCI format.

Aspect 62: The method of any of Aspects 58-61, wherein: the ACK is received via a dedicated ACK bit in an uplink control information (UCI) when the DCI does not schedule a transmission; and the dedicated ACK bit is received a period of time after an end of a physical downlink control channel (PDCCH) carrying the DCI.

Aspect 63: The method of Aspect 62, wherein the period of time is based, at least in part, on a subcarrier spacing (SCS) associated with a first component carrier (CC) on which the DCI was transmitted and a second CC on which the ACK was received.

Aspect 64: The method of any of Aspects 55-63, wherein determining the application time for applying the update based, at least in part, on the slot where the ACK was received comprises determining the application time as a later time among a first time and a second time, wherein: the first time is determined as a function of a first time delay relative to a slot in which the DCI was transmitted; and the second time is determined as a function of a second time delay relative to the slot where the acknowledgement (ACK) was received.

Aspect 65: The method of Aspect 64, further comprising configuring the first time delay.

Aspect 66: The method of Aspect 64 or 65, wherein the first time delay is based, at least in part, on a capability of the UE.

Aspect 67: The method of any of Aspects 64-66, wherein the second time delay is: zero; based, at least in part, on a capability of the UE; or based, at least in part, on a configuration of a network entity.

Aspect 68: The method of Aspect 55, further comprising selecting to: determine the application time as a function of a time delay relative to the slot where the ACK was transmitted; or determine the application time as a later time among a first time and a second time, wherein the first time is determined as a function of a first time delay relative to a slot in which the DCI was received and the second time is determined as a function of a second time delay relative to the slot where the ACK was transmitted; and determining the application time in accordance with the selection.

Aspect 69: The method of Aspect 68, wherein the selection is based, at least in part, on at least one of: signaling sent to the UE; whether the ACK comprises a non-dedicated ACK or a dedicated ACK; a format of the DCI; and a subcarrier spacing (SCS) associated with a first component carrier (CC) on which the DCI was transmitted and a second CC on which the update is to be applied.

Aspect 70: The method of Aspect 68 or 69, further comprising receiving an indication of a capability of the UE to support selection of at least one of the first rule, the second rule, and the third rule.

Aspect 71: An apparatus, comprising a memory comprising computer-executable instructions and one or more processors configured to execute the computer-executable instructions and cause the one or more processors to perform a method in accordance with any one of claims 1-70.

Aspect 72: An apparatus, comprising means for performing a method in accordance with any one of claims 1-70.

Aspect 73: A non-transitory computer-readable medium comprising computer-executable instructions that, when executed by one or more processors, cause the one or more processors to perform a method in accordance with any one of claims 1-70.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8, 9, 13, and 14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving a downlink control information (DCI) indicating an update to be applied to at least one of an uplink (UL) transmission or a downlink (DL) transmission;
determining an application time for applying the update based, at least in part, on a slot where an acknowledgement (ACK) was transmitted, wherein determining the application time for applying the update comprises determining the application time as a function of a time delay relative to the slot where the ACK was transmitted, and wherein the time delay is based, at least in part, on a capability of the UE; and
applying the update in accordance with the determined application time.

2. The method of claim 1, wherein the update comprises an update to at least one of an UL power control (PC) parameter or a path loss (PL) reference signal (RS) used when calculating transmit power for one or more UL transmissions.

3. The method of claim 1, wherein the update comprises an update to a transmission configuration indicator (TCI) state.

4. The method of claim 1, wherein the ACK comprises a non-dedicated ACK transmitted in response to a DL transmission scheduled by the DCI, when the DCI has a DL DCI format.

5. The method of claim 1, wherein the ACK comprises a non-dedicated ACK transmitted as an UL transmission scheduled by the DCI, when the DCI has a UL DCI format.

6. The method of claim 1, wherein:
the ACK is conveyed via a dedicated ACK bit in an uplink control information (UCI) when the DCI does not schedule a transmission; and
the dedicated ACK bit is transmitted a period of time after an end of a physical downlink control channel (PDCCH) carrying the DCI.

7. The method of claim 6, wherein the period of time is based, at least in part, on a subcarrier spacing (SCS) associated with a first component carrier (CC) on which the DCI was received and a second CC on which the ACK was transmitted.

8. A method for wireless communication by a network entity, comprising:
transmitting, to a user equipment (UE), a downlink control information (DCI) indicating an update to be applied to at least one of an uplink (UL) transmission or a downlink (DL) transmission;
receiving an indication of a capability of the UE;
determining an application time for applying the update based, at least in part, on a slot where an acknowledgement (ACK) was received, wherein determining the application time for applying the update comprises determining the application time as a function of a time delay relative to the slot where the ACK was received, and wherein the time delay is based, at least in part, on the capability of the UE; and
applying the update in accordance with the determined application time.

9. The method of claim 8, wherein the update comprises an update to at least one of an UL power control (PC) parameter or a path loss (PL) reference signal (RS) used when calculating transmit power for one or more UL transmissions.

10. The method of claim 9, wherein the update comprises an update to a transmission configuration indicator (TCI) state.

11. The method of claim 8, wherein the ACK comprises a non-dedicated ACK received in response to a DL transmission scheduled by the DCI, when the DCI has a DL DCI format.

12. The method of claim 8, wherein the ACK comprises a non-dedicated ACK received as an UL transmission scheduled by the DCI, when the DCI has a UL DCI format.

13. The method of claim 8, wherein:
the ACK is received via a dedicated ACK bit in an uplink control information (UCI) when the DCI does not schedule a transmission; and
the dedicated ACK bit is received a period of time after an end of a physical downlink control channel (PDCCH) carrying the DCI.

14. The method of claim 13, wherein the period of time is based, at least in part, on a subcarrier spacing (SCS) associated with a first component carrier (CC) on which the DCI was transmitted and a second CC on which the ACK was received.

15. An apparatus for wireless communication, comprising:
memory; and
one or more processors coupled to the memory, the one or more processors, individually or collectively, being configured to:
receive a downlink control information (DCI) indicating an update to be applied to at least one of an uplink (UL) transmission or a downlink (DL) transmission;
determine an application time for applying the update based, at least in part, on a slot where an acknowledgement (ACK) was transmitted, wherein to determine the application time for applying the update, the one or more processors, individually or collectively, are configured to determine the application time as a function of a time delay relative to the slot where the ACK was transmitted, and wherein the time delay is based, at least in part, on a capability of the apparatus; and
apply the update in accordance with the determined application time.

16. An apparatus for wireless communication, comprising:
memory; and
one or more processors coupled to the memory, the one or more processors, individually or collectively, being configured to:
transmit, to a user equipment (UE), a downlink control information (DCI) indicating an update to be applied to at least one of an uplink (UL) transmission or a downlink (DL) transmission;
receive an indication of a capability of the UE;
determine an application time for applying the update based, at least in part, on a slot where an acknowledgement (ACK) was received, wherein to determine the application time for applying the update, the one or more processors, individually or collectively, are configured to determine the application time as a function of a time delay relative to the slot where the ACK was received, and wherein the time delay is based, at least in part, on the capability of the UE; and
apply the update in accordance with the determined application time.

17. The apparatus of claim 15, wherein the update comprises an update to at least one of an UL power control (PC) parameter or a path loss (PL) reference signal (RS) used when calculating transmit power for one or more UL transmissions.

18. The apparatus of claim 15, wherein the update comprises an update to a transmission configuration indicator (TCI) state.

19. The apparatus of claim 16, wherein the update comprises an update to at least one of an UL power control (PC) parameter or a path loss (PL) reference signal (RS) used when calculating transmit power for one or more UL transmissions.

20. An apparatus for wireless communication, comprising:
memory; and
one or more processors coupled to the memory, the one or more processors, individually or collectively, being configured to:
receive a downlink control information (DCI) indicating an update to be applied to at least one of an uplink (UL) transmission or a downlink (DL) transmission;
determine an application time for applying the update based, at least in part, on a slot where an acknowledgement (ACK) was transmitted, wherein to determine the application time for applying the update, the one or more processors, individually or collectively, are configured to determine the application time as a later time among a first time and a second time, wherein:
the first time is determined as a function of a first time delay relative to a slot in which the DCI was received; and
the second time is determined as a function of a second time delay relative to the slot where the ACK was transmitted; and
apply the update in accordance with the determined application time.

21. The apparatus of claim 20, wherein the first time delay is:
configured by a network entity; or
based, at least in part, on a capability of the apparatus.

22. The apparatus of claim 20, wherein the second time delay is:
zero;
based, at least in part, on a capability of the apparatus; or
based, at least in part, on a configuration of a network entity.

23. The apparatus of claim 20, wherein the update comprises an update to at least one of an UL power control (PC) parameter or a path loss (PL) reference signal (RS) used when calculating transmit power for one or more UL transmissions.

24. The apparatus of claim 20, wherein the update comprises an update to a transmission configuration indicator (TCI) state.

25. An apparatus for wireless communication, comprising:
memory; and
one or more processors coupled to the memory, the one or more processors, individually or collectively, being configured to:
transmit, to a user equipment (UE), a downlink control information (DCI) indicating an update to be applied to at least one of an uplink (UL) transmission or a downlink (DL) transmission;

determine an application time for applying the update based, at least in part, on a slot where an acknowledgement (ACK) was received, wherein to determine the application time for applying the update, the one or more processors, individually or collectively, are configured to determine the application time as a later time among a first time and a second time, wherein:
- the first time is determined as a function of a first time delay relative to a slot in which the DCI was transmitted; and
- the second time is determined as a function of a second time delay relative to the slot where the acknowledgement (ACK) was received; and apply the update in accordance with the determined application time.

26. The apparatus of claim 25, further comprising configuring the first time delay.

27. The apparatus of claim 25, wherein the first time delay is based, at least in part, on a capability of the UE.

28. The apparatus of claim 25, wherein the second time delay is:
- zero;
- based, at least in part, on a capability of the UE; or
- based, at least in part, on a configuration of a network entity.

29. The apparatus of claim 25, wherein the update comprises an update to at least one of an UL power control (PC) parameter or a path loss (PL) reference signal (RS) used when calculating transmit power for one or more UL transmissions.

30. The apparatus of claim 25, wherein the update comprises an update to a transmission configuration indicator (TCI) state.

* * * * *